(12) United States Patent
Churan

(10) Patent No.: US 7,421,342 B2
(45) Date of Patent: *Sep. 2, 2008

(54) NETWORK-ASSISTED GLOBAL POSITIONING SYSTEMS, METHODS AND TERMINALS INCLUDING DOPPLER SHIFT AND CODE PHASE ESTIMATES

(75) Inventor: Gary G. Churan, Annandale, VA (US)

(73) Assignee: ATC Technologies, LLC, Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/559,560

(22) Filed: Nov. 14, 2006

(65) Prior Publication Data

US 2007/0233383 A1    Oct. 4, 2007

Related U.S. Application Data

(63) Continuation of application No. 10/751,715, filed on Jan. 5, 2004, now Pat. No. 7,155,340.

(60) Provisional application No. 60/438,967, filed on Jan. 9, 2003.

(51) Int. Cl.
*G01S 5/10* (2006.01)
(52) U.S. Cl. .................................. 701/213; 342/357.01
(58) Field of Classification Search ................ 701/213; 342/357.01, 357.06, 357.07, 357.05, 357.09, 342/357.1, 357.12, 357.13, 357.15; 455/12.1
See application file for complete search history.

(56) References Cited

U.S. PATENT DOCUMENTS 4,894,662 A *  1/1990  Counselman .......... 342/357.12

4,901,307 A    2/1990  Gilhousen et al.

(Continued)

FOREIGN PATENT DOCUMENTS

EP    0 506 255 A2    9/1992

(Continued)

OTHER PUBLICATIONS

Global.com, "Globalstar Demonstrates World's First Prototype of Terrestrial System to Supplemental Satellite Phones," http://www.globalcomsatphone.com/globalcom/globalstar_terrestrial_system.html, Jul. 18, 2002, 2 pages.

(Continued)

*Primary Examiner*—Dalena Tran
(74) *Attorney, Agent, or Firm*—Myers Bigel Sibley & Sajovec, P.A.

(57) ABSTRACT

A mobile terminal is configured to receive wireless communications including GPS data from a terrestrial and/or satellite wireless network, and to perform pseudo-range measurements using the GPS data that is received. The mobile terminal may be configured to perform pseudo-range measurements by receiving GPS coarse/acquisition (C/A) signals from GPS satellites, estimating Doppler shifts in the received GPS C/A signals, and estimating received code phases of the GPS C/A signals using the Doppler shifts that are estimated. The estimated code phases and/or the estimated Doppler shifts of the GPS C/A signals can provide the pseudo-range measurements. By removing the Doppler shift from the received signal samples prior to performing the code phase measurement, reduced computational complexity and/or processing time may be obtained.

56 Claims, 23 Drawing Sheets

U.S. PATENT DOCUMENTS

| | | |
|---|---|---|
| 5,073,900 A | 12/1991 | Mallinckrodt |
| 5,303,286 A | 4/1994 | Wiedeman |
| 5,339,330 A | 8/1994 | Mallinckrodt |
| 5,394,561 A | 2/1995 | Freeburg |
| 5,446,756 A | 8/1995 | Mallinckrodt |
| 5,448,623 A | 9/1995 | Wiedeman et al. |
| 5,511,233 A | 4/1996 | Otten |
| 5,535,430 A | 7/1996 | Aoki et al. |
| 5,555,257 A | 9/1996 | Dent |
| 5,584,046 A | 12/1996 | Martinez et al. |
| 5,594,780 A | 1/1997 | Wiedeman et al. |
| 5,612,703 A | 3/1997 | Mallinckrodt |
| 5,619,525 A | 4/1997 | Wiedeman et al. |
| 5,631,898 A | 5/1997 | Dent |
| 5,663,734 A | 9/1997 | Krasner |
| 5,734,678 A | 3/1998 | Paneth et al. |
| 5,761,605 A | 6/1998 | Tawil et al. |
| 5,765,098 A | 6/1998 | Bella |
| 5,805,200 A | 9/1998 | Counselman, III |
| 5,812,947 A | 9/1998 | Dent |
| 5,832,379 A | 11/1998 | Mallinckrodt |
| 5,835,857 A | 11/1998 | Otten |
| 5,848,060 A | 12/1998 | Dent |
| 5,852,721 A | 12/1998 | Dillon et al. |
| 5,878,329 A | 3/1999 | Mallinckrodt |
| 5,884,142 A | 3/1999 | Wiedeman et al. |
| 5,907,541 A | 5/1999 | Fairholm et al. |
| 5,926,758 A | 7/1999 | Grybos et al. |
| 5,937,332 A | 8/1999 | Karabinis |
| 5,940,753 A | 8/1999 | Mallinckrodt |
| 5,982,324 A * | 11/1999 | Watters et al. ......... 342/357.06 |
| 5,991,345 A | 11/1999 | Ramasastry |
| 5,995,832 A | 11/1999 | Mallinckrodt |
| 6,011,951 A | 1/2000 | King et al. |
| 6,023,605 A | 2/2000 | Sasaki et al. |
| 6,052,560 A | 4/2000 | Karabinis |
| 6,052,586 A | 4/2000 | Karabinis |
| 6,061,018 A | 5/2000 | Sheynblat |
| 6,067,442 A | 5/2000 | Wiedeman et al. |
| 6,072,430 A | 6/2000 | Wyrwas et al. |
| 6,085,094 A | 7/2000 | Vasudevan et al. |
| 6,091,933 A | 7/2000 | Sherman et al. |
| 6,097,752 A | 8/2000 | Wiedeman et al. |
| 6,097,974 A | 8/2000 | Camp, Jr. et al. |
| 6,101,385 A | 8/2000 | Monte et al. |
| 6,104,338 A | 8/2000 | Krasner |
| 6,108,561 A | 8/2000 | Mallinckrodt |
| 6,121,928 A | 9/2000 | Sheynblat et al. |
| 6,133,874 A | 10/2000 | Krasner |
| 6,134,437 A | 10/2000 | Karabinis et al. |
| 6,157,811 A | 12/2000 | Dent |
| 6,157,834 A | 12/2000 | Helm et al. |
| 6,160,994 A | 12/2000 | Wiedeman |
| 6,169,514 B1 | 1/2001 | Sullivan |
| 6,169,878 B1 | 1/2001 | Tawil et al. |
| 6,198,730 B1 | 3/2001 | Hogberg et al. |
| 6,198,921 B1 | 3/2001 | Youssefzadeh et al. |
| 6,201,967 B1 | 3/2001 | Goerke |
| 6,208,297 B1 | 3/2001 | Fattouche et al. |
| 6,233,463 B1 | 5/2001 | Wiedeman et al. |
| 6,240,124 B1 | 5/2001 | Wiedeman et al. |
| 6,249,245 B1 | 6/2001 | Watters et al. |
| 6,253,080 B1 | 6/2001 | Wiedeman et al. |
| 6,256,497 B1 | 7/2001 | Chambers |
| 6,281,837 B1 | 8/2001 | Richton et al. |
| 6,295,023 B1 | 9/2001 | Bloebaum |
| 6,324,405 B1 | 11/2001 | Young et al. |
| 6,339,707 B1 | 1/2002 | Wainfan et al. |
| 6,415,154 B1 | 7/2002 | Wang et al. |
| 6,418,147 B1 | 7/2002 | Wiedeman |
| 6,424,826 B1 | 7/2002 | Horton et al. |
| 6,449,461 B1 | 9/2002 | Otten |
| 6,493,378 B1 * | 12/2002 | Zhodzishsky et al. ....... 375/149 |
| 6,522,865 B1 | 2/2003 | Otten |
| 6,628,919 B1 | 9/2003 | Curello et al. |
| 6,684,057 B2 | 1/2004 | Karabinis |
| 6,735,437 B2 | 5/2004 | Mayfield et al. |
| 6,775,251 B1 | 8/2004 | Wiedeman |
| 6,785,543 B2 | 8/2004 | Karabinis |
| 6,799,050 B1 * | 9/2004 | Krasner ................... 455/456.1 |
| 6,856,787 B2 | 2/2005 | Karabinis |
| 6,859,652 B2 | 2/2005 | Karabinis et al. |
| 6,879,829 B2 | 4/2005 | Dutta et al. |
| 6,892,068 B2 | 5/2005 | Karabinis et al. |
| 6,937,857 B2 | 8/2005 | Karabinis |
| 6,975,837 B1 | 12/2005 | Santoru |
| 6,999,720 B2 | 2/2006 | Karabinis |
| 7,006,789 B2 | 2/2006 | Karabinis et al. |
| 7,031,702 B2 | 4/2006 | Karabinis et al. |
| 7,039,400 B2 | 5/2006 | Karabinis et al. |
| 7,062,267 B2 | 6/2006 | Karabinis |
| 7,092,708 B2 | 8/2006 | Karabinis |
| 2001/0002822 A1 * | 6/2001 | Watters et al. ........... 342/357.1 |
| 2002/0122408 A1 | 9/2002 | Mullins |
| 2002/0146979 A1 | 10/2002 | Regulinski et al. |
| 2002/0177465 A1 | 11/2002 | Robinett |
| 2002/0193108 A1 * | 12/2002 | Robinett ..................... 455/427 |
| 2003/0003815 A1 | 1/2003 | Yamada |
| 2003/0022625 A1 | 1/2003 | Otten et al. |
| 2003/0054762 A1 | 3/2003 | Karabinis |
| 2003/0054814 A1 | 3/2003 | Karabinis et al. |
| 2003/0054815 A1 | 3/2003 | Karabinis |
| 2003/0068978 A1 | 4/2003 | Karabinis et al. |
| 2003/0073436 A1 | 4/2003 | Karabinis et al. |
| 2003/0149986 A1 | 8/2003 | Mayfield et al. |
| 2003/0153308 A1 | 8/2003 | Karabinis |
| 2004/0072539 A1 | 4/2004 | Monte et al. |
| 2004/0102156 A1 | 5/2004 | Loner |
| 2004/0121727 A1 | 6/2004 | Karabinis |
| 2004/0142660 A1 | 7/2004 | Churan |
| 2004/0192200 A1 | 9/2004 | Karabinis |
| 2004/0192293 A1 | 9/2004 | Karabinis |
| 2004/0192395 A1 | 9/2004 | Karabinis |
| 2004/0203393 A1 | 10/2004 | Chen |
| 2004/0203742 A1 | 10/2004 | Karabinis |
| 2004/0240525 A1 | 12/2004 | Karabinis et al. |
| 2005/0026606 A1 | 2/2005 | Karabinis |
| 2005/0037749 A1 | 2/2005 | Karabinis et al. |
| 2005/0041619 A1 | 2/2005 | Karabinis et al. |
| 2005/0064813 A1 | 3/2005 | Karabinis |
| 2005/0079816 A1 | 4/2005 | Singh et al. |
| 2005/0090256 A1 | 4/2005 | Dutta |
| 2005/0118948 A1 | 6/2005 | Karabinis et al. |
| 2005/0136836 A1 | 6/2005 | Karabinis et al. |
| 2005/0164700 A1 | 7/2005 | Karabinis |
| 2005/0164701 A1 | 7/2005 | Karabinis et al. |
| 2005/0170834 A1 | 8/2005 | Dutta et al. |
| 2005/0181786 A1 | 8/2005 | Karabinis et al. |
| 2005/0201449 A1 | 9/2005 | Churan |
| 2005/0208890 A1 | 9/2005 | Karabinis |
| 2005/0221757 A1 | 10/2005 | Karabinis |
| 2005/0227618 A1 | 10/2005 | Karabinis et al. |
| 2005/0239399 A1 | 10/2005 | Karabinis |
| 2005/0239403 A1 | 10/2005 | Karabinis |
| 2005/0239404 A1 | 10/2005 | Karabinis |
| 2005/0239457 A1 | 10/2005 | Levin et al. |
| 2005/0245192 A1 | 11/2005 | Karabinis |
| 2005/0260947 A1 | 11/2005 | Karabinis et al. |
| 2005/0260984 A1 | 11/2005 | Karabinis |
| 2005/0265273 A1 | 12/2005 | Karabinis et al. |
| 2005/0272369 A1 | 12/2005 | Karabinis et al. |
| 2005/0282542 A1 | 12/2005 | Karabinis |
| 2005/0288011 A1 | 12/2005 | Dutta |
| 2006/0040613 A1 | 2/2006 | Karabinis et al. |

| | | |
|---|---|---|
| 2006/0040657 A1 | 2/2006 | Karabinis et al. |
| 2006/0040659 A1 | 2/2006 | Karabinis |
| 2006/0094352 A1 | 5/2006 | Karabinis |
| 2006/0094420 A1 | 5/2006 | Karabinis |
| 2006/0105707 A1 | 5/2006 | Karabinis |
| 2006/0111041 A1 | 5/2006 | Karabinis |
| 2006/0111056 A1 | 5/2006 | Dutta |
| 2006/0135058 A1 | 6/2006 | Karabinis |
| 2006/0135060 A1 | 6/2006 | Karabinis |
| 2006/0135070 A1 | 6/2006 | Karabinis |
| 2006/0165120 A1 | 7/2006 | Karabinis |
| 2006/0189274 A1 | 8/2006 | Karabinis |
| 2006/0189275 A1 | 8/2006 | Karabinis |
| 2006/0189309 A1 | 8/2006 | Good et al. |
| 2006/0194576 A1 | 8/2006 | Karabinis et al. |
| 2006/0205346 A1 | 9/2006 | Evans et al. |
| 2006/0205347 A1 | 9/2006 | Karabinis |
| 2006/0205367 A1 | 9/2006 | Karabinis |
| 2006/0211371 A1 | 9/2006 | Karabinis et al. |
| 2006/0211419 A1 | 9/2006 | Karabinis |
| 2006/0211452 A1 | 9/2006 | Karabinis |
| 2006/0217070 A1 | 9/2006 | Karabinis |
| 2006/0232465 A1 | 10/2006 | Levin et al. |
| 2006/0233147 A1 | 10/2006 | Karabinis |
| 2006/0246838 A1 | 11/2006 | Karabinis |

FOREIGN PATENT DOCUMENTS

| | | |
|---|---|---|
| EP | 0 597 255 A1 | 5/1994 |
| EP | 0 506 255 B1 | 11/1996 |
| EP | 0 748 065 A2 | 12/1996 |
| EP | 0 755 162 A2 | 1/1997 |
| EP | 0 762 669 A2 | 3/1997 |
| EP | 0 762 669 A3 | 3/1997 |
| EP | 0 797 319 A2 | 9/1997 |
| EP | 0 831 599 A2 | 3/1998 |
| EP | 0 831 599 A3 | 3/1998 |
| EP | 1 059 826 A1 | 12/2000 |
| EP | 1 193 989 A1 | 4/2002 |
| WO | WO 01/54314 A1 | 7/2001 |

OTHER PUBLICATIONS

Ayyagari et al., "A satellite-augmented cellular network concept", *Wireless Networks*, Vo. 4, 1998, pp. 189-198.

International Preliminary Examination Report, PCT/US02/24783, Apr. 30, 2003.

International Search Report, PCT/US02/24783, Dec. 10, 2002.

Dana, *Global Positioning System Overview*, The Geographer's Craft Project, Department of Geography, The University of Colorado at Boulder, 1999.

* cited by examiner

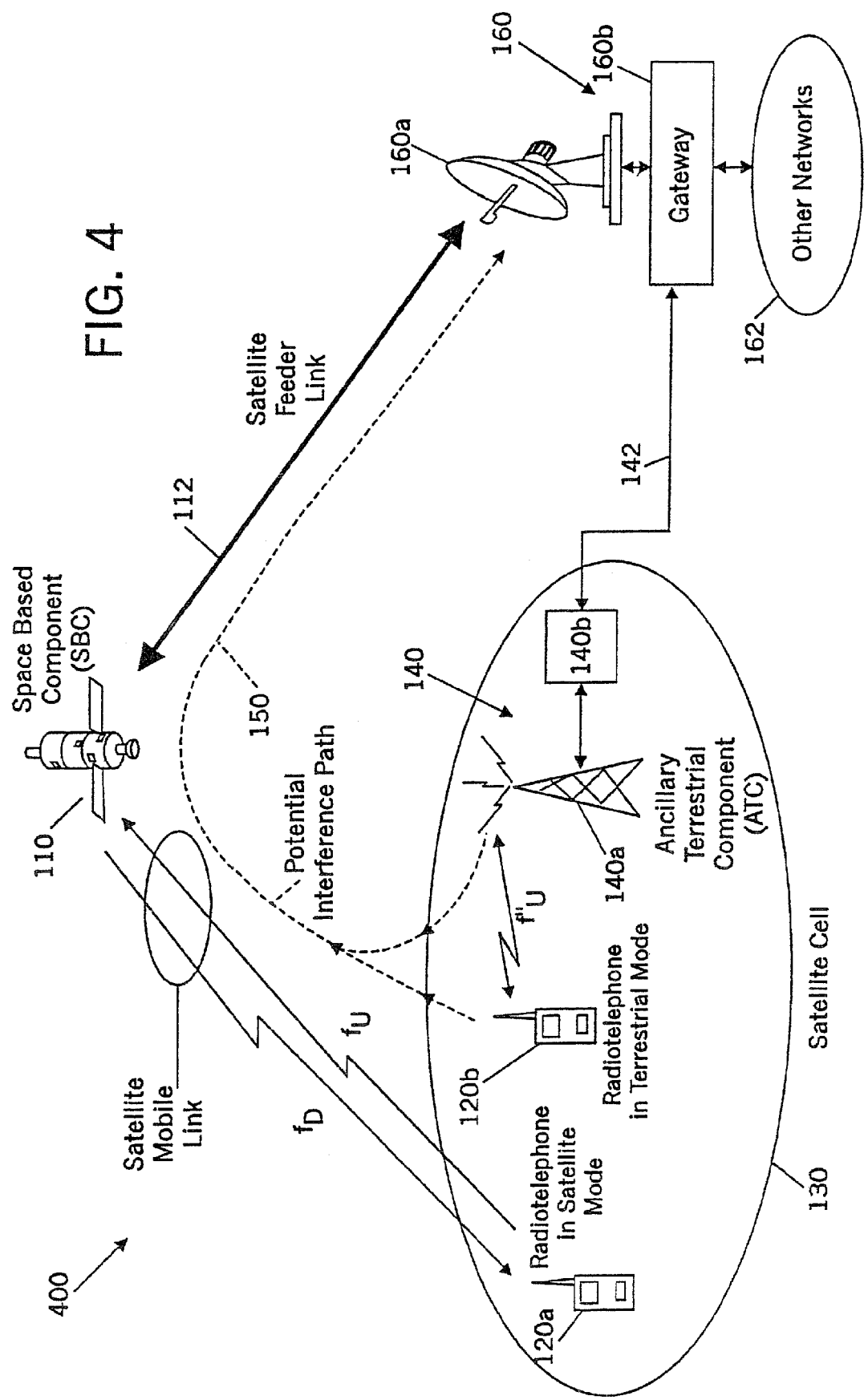

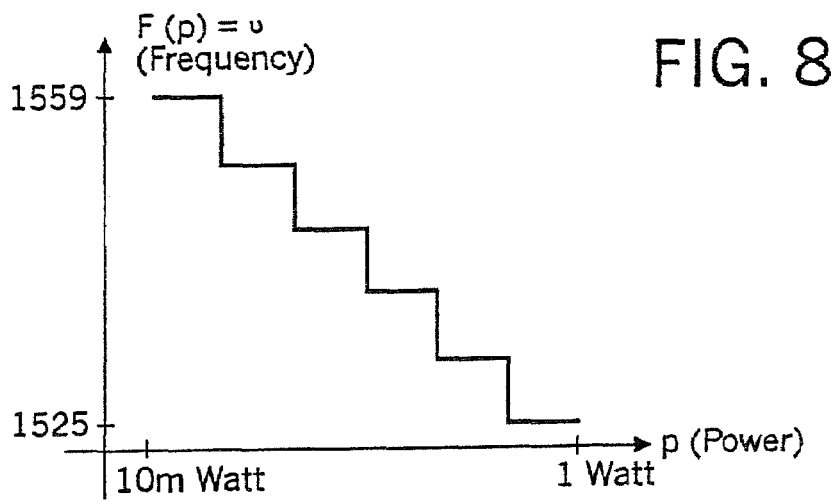
FIG. 8
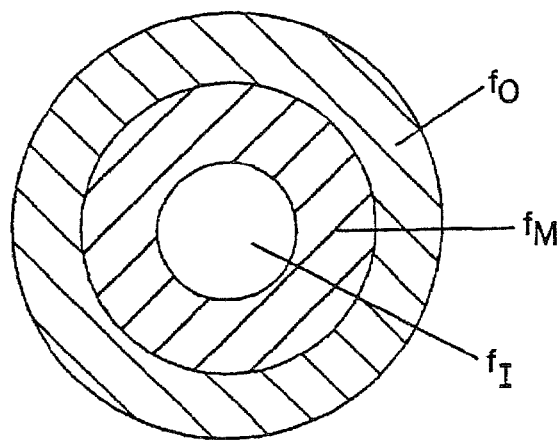
FIG. 9
FIG. 10
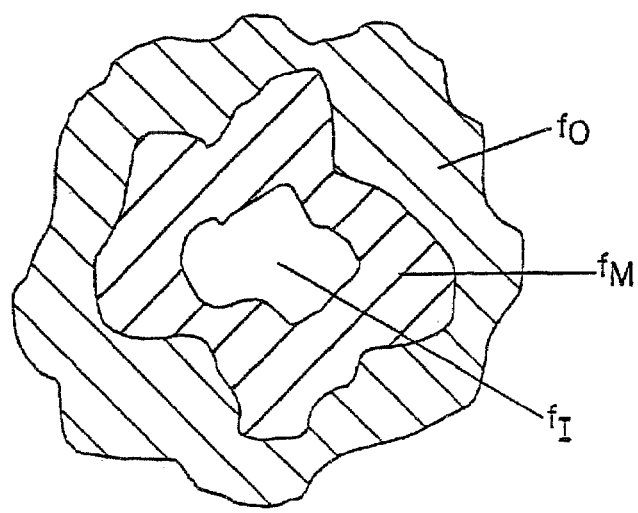

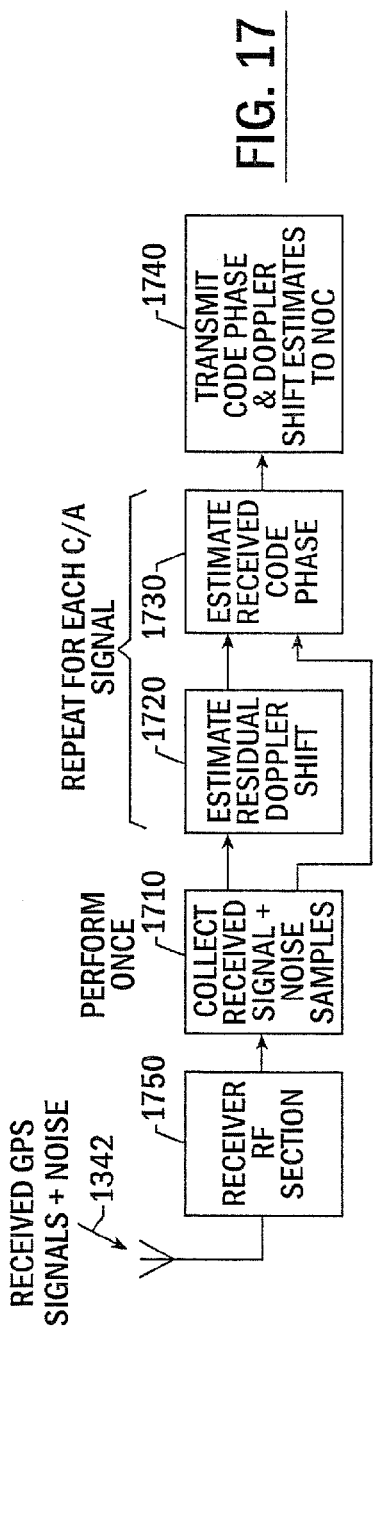
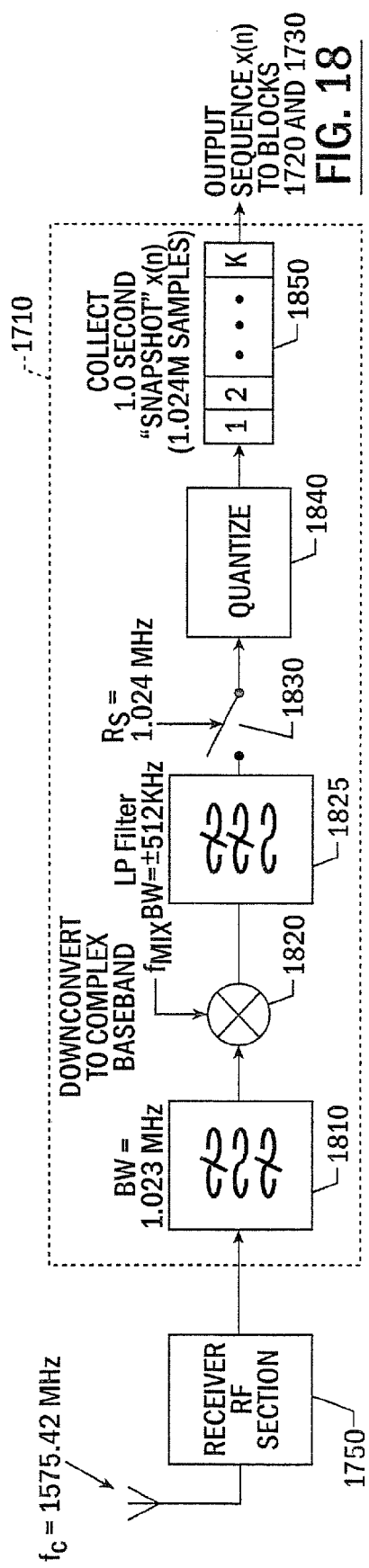

NETWORK-ASSISTED GLOBAL POSITIONING SYSTEMS, METHODS AND TERMINALS INCLUDING DOPPLER SHIFT AND CODE PHASE ESTIMATES

CROSS-REFERENCE TO RELATED APPLICATIONS

This application is a continuation of application Ser. No. 10/751,715, filed Jan. 5, 2004, entitled Network-Assisted Global Positioning Systems, Methods and Terminal Including Doppler Shift and Code Phase Estimates (now U.S. Pat. No. 7,155,340 and claims the benefit of Provisional Application No. 60/438,967, filed Jan. 9, 2003, entitled Terrestrial Network-Assisted Global Positioning Systems, Methods and Terminals Including Doppler Shift Estimates, assigned to the assignee of the present invention, the disclosures of which are hereby incorporated hereby by reference in their entirety as if set forth fully herein.

FIELD OF THE INVENTION

This invention relates to cellular wireless communications systems, methods and mobile terminals, and more particularly to cellular wireless communications systems, methods and mobile terminals that include Global Positioning System (GPS) capabilities.

BACKGROUND OF THE INVENTION

Cellular wireless communications systems, methods and mobile terminals are widely used for voice and/or data communications. As is well known to those having skill in the art, cellular wireless communications systems, methods and mobile terminals include terrestrial cellular wireless communications systems, methods and mobile terminals, and/or satellite cellular wireless communications systems, methods and mobile terminals. As used herein, the term "mobile terminal" includes cellular and/or satellite radiotelephones with or without a multi-line display; Personal Communications System (PCS) terminals that may combine a radiotelephone with data processing, facsimile and/or data communications capabilities; Personal Digital Assistants (PDA) that can include a radio frequency transceiver and a pager, Internet/intranet access, Web browser, organizer, calendar and/or a global positioning system (GPS) receiver; and/or conventional laptop and/or palmtop computers or other appliances, which include a radio frequency transceiver.

It may be desirable, and may be mandatory in the future, that mobile terminals be equipped to determine the geographical location thereof, for example, to support emergency position reporting, often referred to as "E911" position reporting. One way to accomplish this result is to add a GPS receiver to a mobile terminal. As is well known to those having skill in the art, GPS is a satellite navigation system that is funded by and controlled by the U.S. Department of Defense, that provides specially coded satellite signals that can be processed in a GPS receiver, enabling the receiver to compute position, velocity and/or time. A description of the GPS system may be found in the publication entitled *Global Positioning System Overview* by Peter H. Dana, 1999, the disclosure of which is hereby incorporated herein by reference in its entirety as if set forth fully herein. As used herein, the term "GPS" also includes other satellite-based systems that can be used to measure positions on the earth, such as GLONASS.

GPS receivers may be expensive, increase mobile terminal size and/or consume the limited amount of battery power that is available to the mobile terminal. Accordingly, techniques have been proposed to integrate some or all of a GPS receiver into a mobile terminal. See, for example, U.S. Pat. No. 6,424,826 to Horton et al. entitled Systems and Methods for Sharing Reference Frequency Signals Within a Wireless Mobile Terminal Between a Wireless Transceiver and a Global Positioning System Receiver; and U.S. Pat. No. 6,097,974 to Camp, Jr. et al. entitled Combined GPS and Wide Bandwidth Radiotelephone Terminals and Methods.

Moreover, it is known that GPS receivers may suffer from latency in achieving a time to first fix, due to the time that it may take for the GPS receiver to download the necessary GPS satellite ephemeris data. Accordingly, systems have been proposed to shorten the time to first fix. See, for example, U.S. Pat. No. 6,415,154 to Wang et al. entitled Method and Apparatus for Communicating Auxilliary Information and Location Information Between a Cellular Telephone Network and a Global Positioning System Receiver for Reducing Code Shift Search Time of the Receiver; U.S. Pat. No. 6,295,023 to Bloebaum entitled Methods, Mobile Stations and Systems for Acquiring Global Positioning System Timing Information; U.S. Pat. No. 6,169,514 to Sullivan entitled Low-Power Satellite-Based Geopositioning System; and U.S. Pat. No. 5,663,734 to Krasner entitled GPS Receiver and Method for Processing GPS Signals.

In-building GPS operation may be particularly challenging, because the GPS receiver may need to overcome an additional 20 dB-25 dB degradation in received signal-to-noise ratio due to in-building attenuation. This may produce a hundred fold or more increase in the GPS signal processing latency time, compared to an outdoor use.

SUMMARY OF THE INVENTION

Wireless communications systems according to some embodiments of the present invention include a terrestrial wireless network that is configured to transmit wireless communications including GPS data over a satellite frequency band, and a mobile terminal that is configured to receive the wireless communications including the GPS data from the terrestrial wireless network over the satellite frequency band, and to perform pseudo-range measurements using the GPS data that is received over the satellite frequency band. Accordingly, a terrestrial wireless network that uses satellite frequency bands for terrestrial communications may be used to provide a GPS assist to mobile terminals.

In other embodiments of the present invention, the mobile terminal is further configured to transmit the pseudo-range measurements to a network operations center. In other embodiments, the network operations center is configured to determine a position of the mobile terminal using the pseudo-range measurements. In yet other embodiments, the network operations center is further configured to transmit the position of the mobile terminal to the mobile terminal. In some embodiments, the mobile terminal is configured to transmit the pseudo-range measurements to the network operations center via the terrestrial wireless network. In other embodiments, the mobile terminal is configured to transmit the pseudo-range measurements to the network operations center via a space-based component.

In still other embodiments of the present invention, a mobile terminal is configured to perform pseudo-range measurements by receiving GPS coarse/acquisition (C/A) signals from a plurality of GPS satellites, estimating Doppler shifts in the GPS coarse acquisition (C/A) signals and estimating received code phases of the GPS C/A signals using the Doppler shifts that are estimated. The estimated received code phases and/or the estimated Doppler shifts of the GPS C/A signals, along with the time of measurement, can provide the pseudo-range measurements. In these embodiments, by using the estimated Doppler shifts to estimate the received code phases of the GPS C/A signals, reduced code searching time may be obtained. It also will be understood that the embodiments described in this paragraph may be used by mobile terminals independent of the use of a terrestrial network to transmit GPS data over a satellite frequency band, and/or may be used by standalone GPS receivers with cellular data receiving capabilities.

More specifically, mobile terminals according to some embodiments of the present invention include a receiver that is configured to receive GPS C/A signals from a plurality of GPS satellites and a processor that is configured to estimate Doppler shifts in the GPS C/A signals and to estimate received code phases of the GPS C/A signals using the Doppler shifts that are estimated. In some embodiments, the receiver is further configured to receive from a wireless network, a Doppler shift that is measured at the wireless network, and a code phase that is measured at the wireless network. The processor is further configured to estimate residual Doppler shifts in the GPS C/A signals due to mobile terminal motion, using the Doppler shift and code phase that are measured at the wireless network, and to estimate the received code phases of the GPS C/A signals using the Doppler shift that is estimated. It also will be understood that embodiments described in this paragraph may be used by mobile terminals independent of the use of a terrestrial network to transmit GPS data over a satellite frequency band, and/or may be used by GPS processors with cellular data receiving capabilities.

In particular, in some embodiments, the processor is configured to estimate the residual Doppler shifts in the GPS C/A signals due to mobile terminal motion by bandpass filtering the GPS C/A signals into frequency slices (i.e., slices in the frequency domain), despreading the slices and estimating the Doppler shifts from the frequency slices that are despread. In other embodiments, the processor is configured to bandpass filter the GPS C/A into frequency slices by frequency translating the GPS C/A signals, low pass filtering the GPS C/A signals that are frequency translated and downsampling the low pass filtered, frequency translated GPS C/A signals. In other embodiments, the processor is configured to despread the frequency slices by generating an internal reference code sequence approximately matched to the code sequence used by the C/A signal, frequency translating the internal reference code sequence for each frequency slice, low pass filtering the frequency translated reference code sequences and multiplying by the downsampled low pass filtered, frequency translated, GPS C/A signal slices.

In still other embodiments, the processor is configured to estimate the Doppler shifts from the frequency slices that are despread by frequency-translating the frequency slices that are despread by the Doppler shift frequency that is measured at the wireless network, to obtain the residual Doppler shift complex frequency due to mobile terminal motion, transforming the despread frequency translated slice sample points to the frequency domain, converting frequency domain complex values to magnitude values and adding the magnitude values on a point-by-point basis across the frequency slices. Moreover, in still other embodiments, the processor is configured to estimate the code phases of the GPS C/A signals by removing a total Doppler shift by frequency-translating the GPS C/A signals by the sum of the residual Doppler shifts that are estimated plus the Doppler shift that is measured at the wireless network, summing segments of the GPS C/A signals from which the total Doppler shift has been removed, correlating the summed segments with an internally generated code frame and determining a time offset corresponding to the location of the peak magnitude squared value. Finally, in still other embodiments, the processor is configured to estimate the code phases of the GPS C/A signals by Fourier-transforming the despread slice signals to the frequency domain, determining phase angles corresponding to the estimated Doppler shift frequency for each of the slices, and determining a code phase from the phase angles.

In some embodiments, as described above, the wireless network is a terrestrial wireless network. In other embodiments, the terrestrial wireless network comprises a terrestrial cellular network, an ancillary terrestrial network and/or a wireless local and/or wide area network. In other embodiments, the wireless network is a satellite wireless network, and the Doppler shift and C/A code phase are measured at the satellite wireless network. In some embodiments, the Doppler shift and C/A code phase that are measured at the satellite wireless network are referenced to a geographic point on the earth determined by measuring relative differences in received signal levels between adjacent spot beams at the mobile terminal. In other embodiments, the Doppler shift and C/A code phase that are measured at the satellite wireless network are referenced to a geographic point on the earth determined by measuring path delays between the mobile terminal and a satellite gateway via at least two satellite transmission paths.

Finally, it will be understood that, although embodiments of the invention have been described above in connection with systems and mobile terminals, other embodiments of the present invention can provide cellular wireless communications methods, wireless networks and methods, and mobile terminal processing methods.

BRIEF DESCRIPTION OF THE DRAWINGS

FIG. 4 is a schematic diagram of cellular satellite systems and methods according to other embodiments of the present invention.

FIG. 8 graphically illustrates mapping of monotonically decreasing power levels to frequencies according to embodiments of the present invention.

FIG. 9 illustrates an ideal cell that is mapped to three power regions and three associated carrier frequencies according to embodiments of the invention.

FIG. 10 depicts a realistic cell that is mapped to three power regions and three associated carrier frequencies according to embodiments of the invention.

FIG. 17 is a block diagram of operations that may performed by a mobile terminal according to still other embodiments of the present invention.

FIG. 18 is a block diagram illustrating detailed embodiments of FIG. 17.

DETAILED DESCRIPTION OF PREFERRED EMBODIMENTS

The present invention now will be described more fully hereinafter with reference to the accompanying drawings, in which embodiments of the invention are shown. However, this invention should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
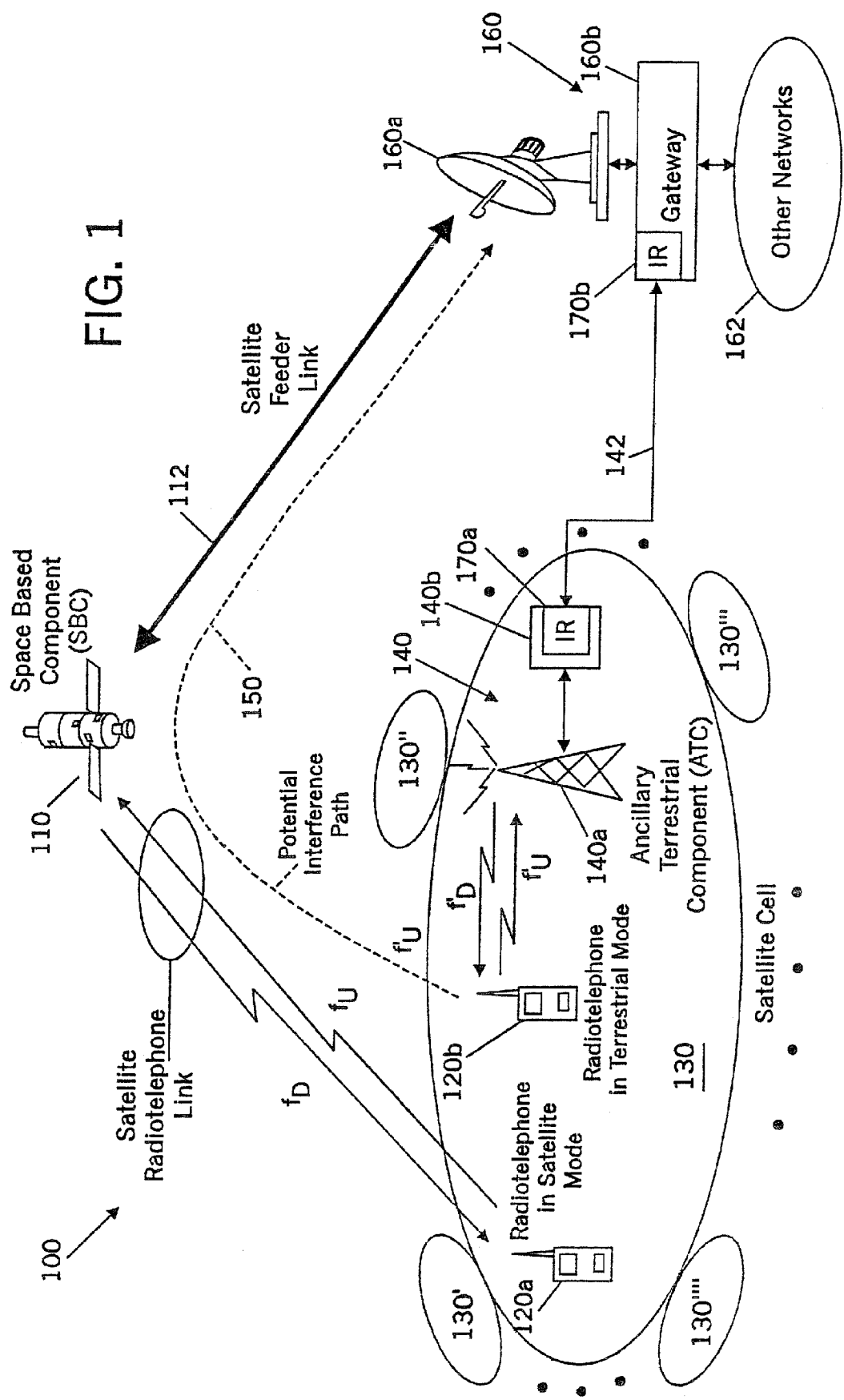
FIG. 1 is a schematic diagram of cellular radiotelephone systems and methods according to embodiments of the invention.

FIG. 1 is a schematic diagram of cellular satellite radiotelephone systems and methods according to embodiments of the invention. As shown in FIG. 1, these cellular satellite radiotelephone systems and methods 100 include at least one Space-Based Component (SBC) 110, such as a satellite. The space-based component 110 is configured to transmit wireless communications to a plurality of radiotelephones 120a, 120b in a satellite footprint comprising one or more satellite radiotelephone cells 130-130"". over one or more satellite radiotelephone forward link (downlink) frequencies $f_D$. The space-based component 110 is configured to receive wireless communications from, for example, a first radiotelephone 120a in the satellite radiotelephone cell 130 over a satellite radiotelephone return link (uplink) frequency $f_U$. An ancillary terrestrial network, comprising at least one ancillary terrestrial component 140, which may include an antenna 140a and an electronics system 140b (for example, at least one antenna 140a and at least one electronics system 140b), is configured to receive wireless communications from, for example, a second radiotelephone 120b in the radiotelephone cell 130 over the satellite radiotelephone uplink frequency, denoted $f'_U$, which may be the same as $f_U$. Thus, as illustrated in FIG. 1, radiotelephone 120a may be communicating with the space-based component 110 while radiotelephone 120b may be communicating with the ancillary terrestrial component 140. As shown in FIG. 1, the space-based component 110 also undesirably receives the wireless communications from the second radiotelephone 120b in the satellite radiotelephone cell 130 over the satellite radiotelephone frequency $f'_U$ as interference. More specifically, a potential interference path is shown at 150. In this potential interference path 150, the return link signal of the second radiotelephone 120b at carrier frequency $f'_U$ interferes with satellite communications. This interference would generally be strongest when $f'_U=f_U$, because, in that case, the same return link frequency would be used for space-based component and ancillary terrestrial component communications over the same satellite radiotelephone cell, and no spatial discrimination between satellite radiotelephone cells would appear to exist.

Still referring to FIG. 1, embodiments of satellite radiotelephone systems/methods 100 can include at least one gateway 160 that can include an antenna 160a and an electronics system 160b that can be connected to other networks 162 including terrestrial and/or other radiotelephone networks. The gateway 160 also communicates with the space-based component 110 over a satellite feeder link 112. The gateway 160 also communicates with the ancillary terrestrial component 140, generally over a terrestrial link 142.

Still referring to FIG. 1, an Interference Reducer (IR) 170a also may be provided at least partially in the ancillary terrestrial component electronics system 140b. Alternatively or additionally, an interference reducer 170b may be provided at least partially in the gateway electronics system 160b. In yet other alternatives, the interference reducer may be provided at least partially in other components of the cellular satellite system/method 100 instead of or in addition to the interference reducer 170a and/or 170b. The interference reducer is responsive to the space-based component 110 and to the ancillary terrestrial component 140, and is configured to reduce the interference from the wireless communications that are received by the space-based component 110 and is at least partially generated by the second radiotelephone 120b in the satellite radiotelephone cell 130 over the satellite radiotelephone frequency $f'_U$. The interference reducer 170a and/ or 170b uses the wireless communications $f'_U$ that are intended for the ancillary terrestrial component 140 from the second radiotelephone 120b in the satellite radiotelephone cell 130 using the satellite radiotelephone frequency $f'_U$ to communicate with the ancillary terrestrial component 140.

In embodiments of the invention, as shown in FIG. 1, the ancillary terrestrial component 140 generally is closer to the first and second radiotelephones 120a and 120b, respectively, than is the space-based component 110, such that the wireless communications from the second radiotelephone 120b are received by the ancillary terrestrial component 140 prior to being received by the space-based component 110. The interference reducer 170a and/or 170b is configured to generate an interference cancellation signal comprising, for example, at least one delayed replica of the wireless communications from the second radiotelephone 120b that are received by the ancillary terrestrial component 140, and to subtract the delayed replica of the wireless communications from the second radiotelephone 120b that are received by the ancillary terrestrial component 140 from the wireless communications that are received from the space-based component 110. The interference reduction signal may be transmitted from the ancillary terrestrial component 140 to the gateway 160 over link 142 and/or using other conventional techniques.

Thus, adaptive interference reduction techniques may be used to at least partially cancel the interfering signal, so that the same, or other nearby, satellite radiotelephone uplink frequency can be used in a given cell for communications by radiotelephones 120 with the satellite 110 and with the ancillary terrestrial component 140. Accordingly, all frequencies that are assigned to a given cell 130 may be used for both radiotelephone 120 communications with the space-based component 110 and with the ancillary terrestrial component 140. Conventional systems may avoid terrestrial reuse of frequencies within a given satellite cell that are being used within the satellite cell for satellite communications. Stated differently, conventionally, only frequencies used by other satellite cells may be candidates for terrestrial reuse within a given satellite cell. Beam-to-beam spatial isolation that is provided by the satellite system was relied upon to reduce or minimize the level of interference from the terrestrial operations into the satellite operations. In sharp contrast, embodiments of the invention can use an interference reducer to allow all frequencies assigned to a satellite cell to be used terrestrially and for satellite radiotelephone communications.

Embodiments of the invention according to FIG. 1 may arise from a realization that the return link signal from the second radiotelephone 120b at $f'_U$ generally will be received and processed by the ancillary terrestrial component 140 much earlier relative to the time when it will arrive at the satellite gateway 160 from the space-based component 110 via the interference path 150. Accordingly, the interference signal at the satellite gateway 160b can be at least partially canceled. Thus, as shown in FIG. 1, an interference cancellation signal, such as the demodulated ancillary terrestrial component signal, can be sent to the satellite gateway 160b by the interference reducer 170a in the ancillary terrestrial component 140, for example using link 142. In the interference reducer 170b at the gateway 160b, a weighted (in amplitude and/or phase) replica of the signal may be formed using, for example, adaptive transversal filter techniques that are well known to those having skill in the art. Then, a transversal filter output signal is subtracted from the aggregate received satellite signal at frequency $f'_U$ that contains desired as well as interference signals. Thus, the interference cancellation need not degrade the signal-to-noise ratio of the desired signal at the gateway 160, because a regenerated (noise-free) terrestrial signal, for example as regenerated by the ancillary terrestrial component 140, can be used to perform interference suppression.

Figure 2:
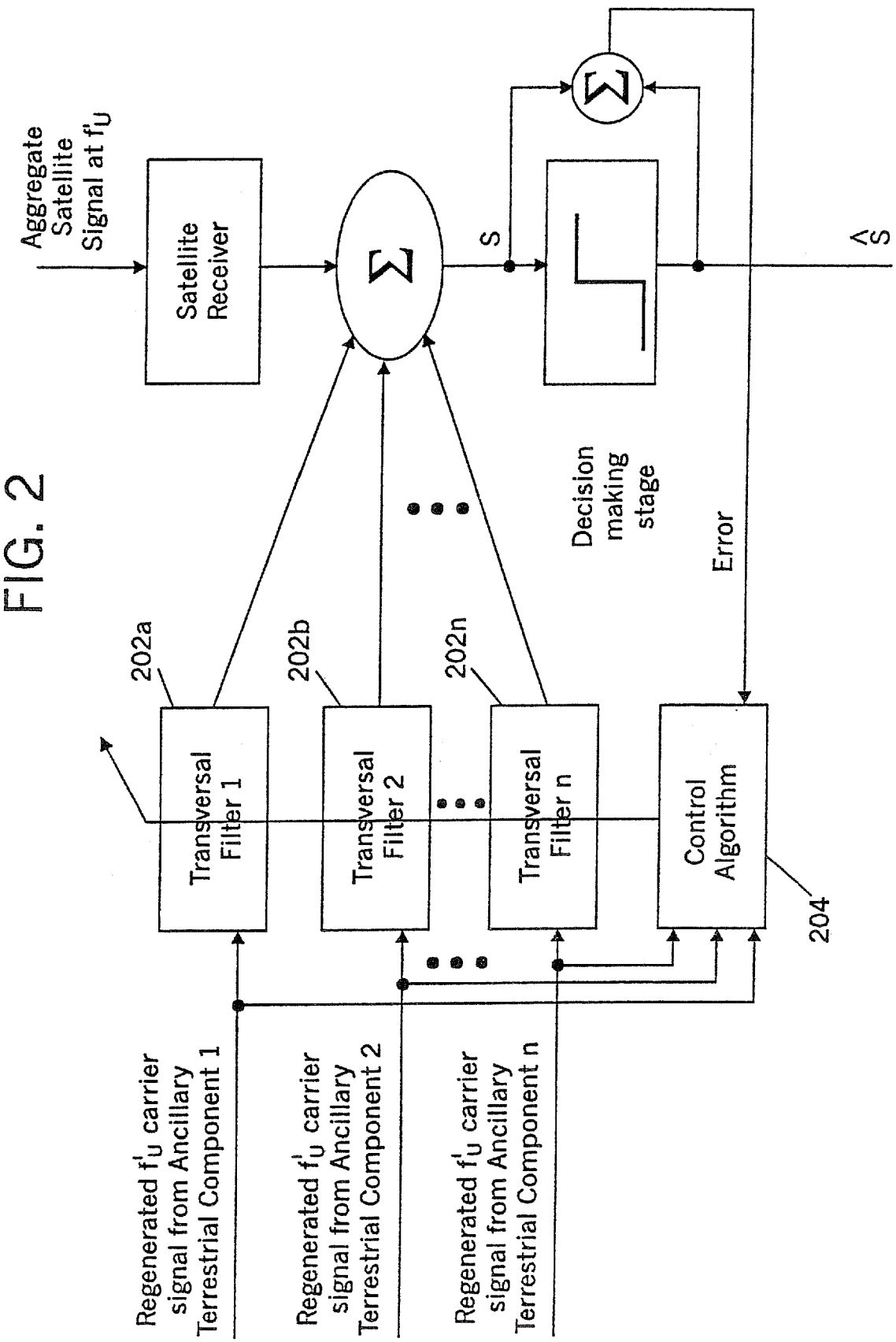
FIG. 2 is a block diagram of adaptive interference reducers according to embodiments of the present invention.

FIG. 2 is a block diagram of embodiments of adaptive interference cancellers that may be located in the ancillary terrestrial component 140, in the gateway 160, and/or in another component of the cellular radiotelephone system 100. As shown in FIG. 2, one or more control algorithms 204, known to those having skill in the art, may be used to adaptively adjust the coefficients of a plurality of transversal filters 202a-202n. Adaptive algorithms, such as Least Mean Square Error (LMSE), Kalman, Fast Kalman, Zero Forcing and/or various combinations thereof or other techniques may be used. It will be understood by those having skill in the art that the architecture of FIG. 2 may be used with an LMSE algorithm. However, it also will be understood by those having skill in the art that conventional architectural modifications may be made to facilitate other control algorithms.

Figure 3:
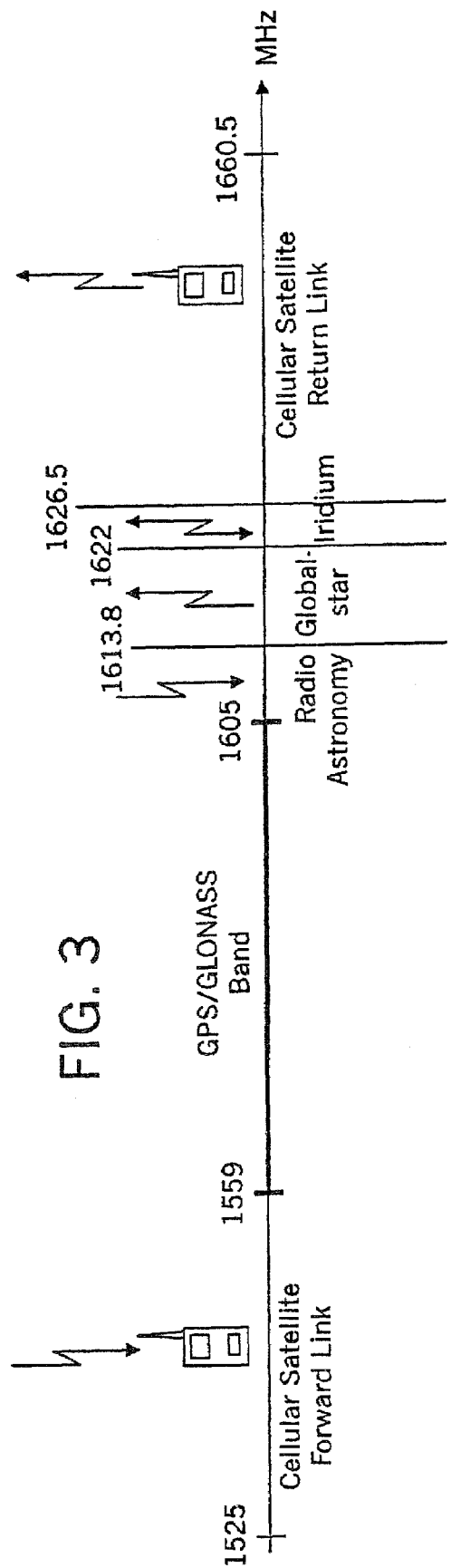
FIG. 3 is a spectrum diagram that illustrates satellite L-band frequency allocations.

Additional embodiments of the invention now will be described with reference to FIG. 3, which illustrates L-band frequency allocations including cellular radiotelephone system forward links and return links. As shown in FIG. 3, the space-to-ground L-band forward link (downlink) frequencies are assigned from 1525 MHz to 1559 MHz. The ground-to-space L-band return link (uplink) frequencies occupy the band from 1626.5 MHz to 1660.5 MHz. Between the forward and return L-band links lie the GPS/GLONASS radionavigation band (from 1559 MHz to 1605 MHz).

In the present application, GPS/GLONASS will be referred to simply as GPS for the sake of brevity. Moreover, the acronyms ATC and SBC will be used for the ancillary terrestrial component and the space-based component, respectively, for the sake of brevity.

As is known to those skilled in the art, GPS receivers may be extremely sensitive since they are designed to operate on very weak spread-spectrum radionavigation signals that arrive on the earth from a GPS satellite constellation. As a result, GPS receivers may to be highly susceptible to in-band interference. ATCs that are configured to radiate L-band frequencies in the forward satellite band (1525 to 1559 MHz) can be designed with very sharp out-of-band emissions filters to satisfy the stringent out-of-band spurious emissions desires of GPS.

Referring again to FIG. 1, some embodiments of the invention can provide systems and methods that can allow an ATC 140 to configure itself in one of at least two modes. In accordance with a first mode, which may be a standard mode and may provide highest capacity, the ATC 140 transmits to the radiotelephones 120 over the frequency range from 1525 MHz to 1559 MHz, and receives transmissions from the radiotelephones 120 in the frequency range from 1626.5 MHz to 1660.5 MHz, as illustrated in FIG. 3. In contrast, in a second mode of operation, the ATC 140 transmits wireless communications to the radiotelephones 120 over a modified range of satellite band forward link (downlink) frequencies. The modified range of satellite band forward link frequencies may be selected to reduce, compared to the unmodified range of satellite band forward link frequencies, interference with wireless receivers such as GPS receivers that operate outside the range of satellite band forward link frequencies.

Many modified ranges of satellite band forward link frequencies may be provided according to embodiments of the present invention. In some embodiments, the modified range of satellite band forward link frequencies can be limited to a subset of the original range of satellite band forward link frequencies, so as to provide a guard band of unused satellite band forward link frequencies. In other embodiments, all of the satellite band forward link frequencies are used, but the wireless communications to the radiotelephones are modified in a manner to reduce interference with wireless receivers that operate outside the range of satellite band forward link frequencies. Combinations and subcombinations of these and/or other techniques also may be used, as will be described below.

It also will be understood that embodiments of the invention that will now be described in connection with FIGS. 4-12 will be described in terms of multiple mode ATCs 140 that can operate in a first standard mode using the standard forward and return links of FIG. 3, and in a second or alternate mode that uses a modified range of satellite band forward link frequencies and/or a modified range of satellite band return link frequencies. These multiple mode ATCs can operate in the second, non-standard mode, as long as desirable, and can be switched to standard mode otherwise. However, other embodiments of the present invention need not provide multiple mode ATCs but, rather, can provide ATCs that operate using the modified range of satellite band forward link and/or return link frequencies.

Embodiments of the invention now will be described, wherein an ATC operates with an SBC that is configured to receive wireless communications from radiotelephones over a first range of satellite band return link frequencies and to transmit wireless communications to the radiotelephones over a second range of satellite band forward link frequencies that is spaced apart from the first range. According to these embodiments, the ATC is configured to use at least one time division duplex frequency to transmit wireless communications to the radiotelephones and to receive wireless communications from the radiotelephones at different times. In particular, in some embodiments, the at least one time division duplex frequency that is used to transmit wireless communications to the radiotelephones and to receive wireless communications from the radiotelephones at different times, comprises a frame including a plurality of slots. At least a first one of the slots is used to transmit wireless communications to the radiotelephones and at least a second one of the slots is used to receive wireless communications from the radiotelephones. Thus, in some embodiments, the ATC transmits and receives, in Time Division Duplex (TDD) mode, using frequencies from 1626.5 MHz to 1660.5 MHz. In some embodiments, all ATCs across the entire network may have the stated configuration/reconfiguration flexibility. In other embodiments, only some ATCs may be reconfigurable.

Figure 5:
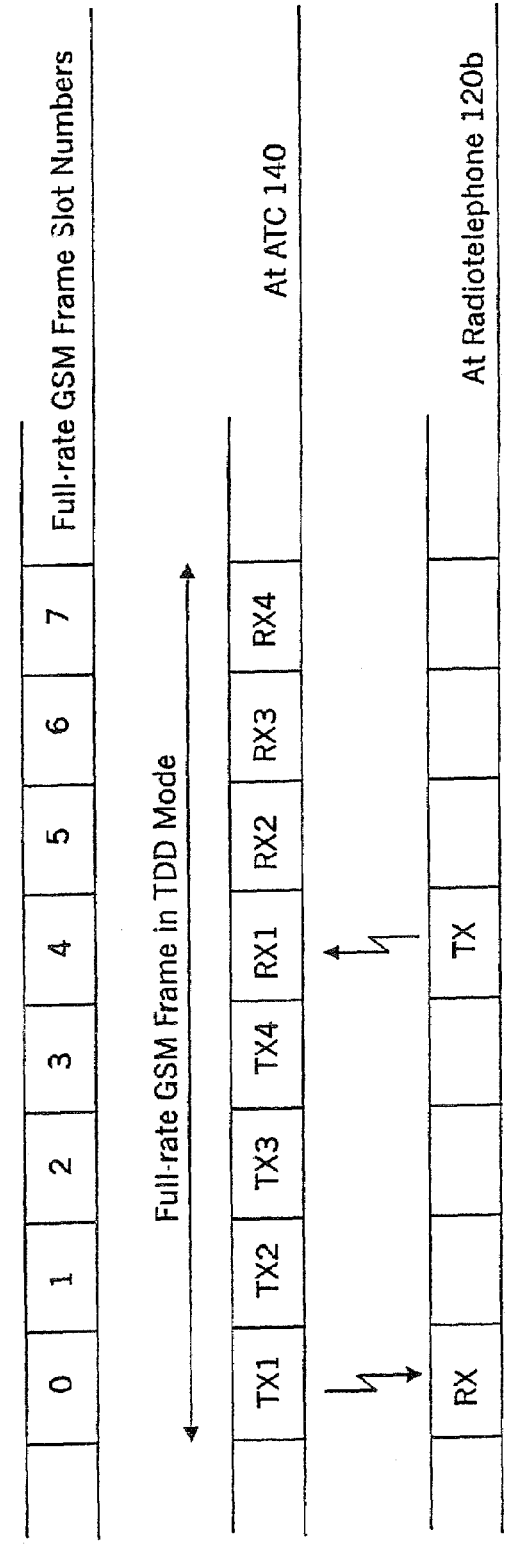
FIG. 5 illustrates time division duplex frame structures according to embodiments of the present invention.

FIG. 4 illustrates satellite systems and methods 400 according to some embodiments of the invention, including an ATC 140 communicating with a radiotelephone 120b using a carrier frequency $f''_U$ in TDD mode. FIG. 5 illustrates an embodiment of a TDD frame structure. Assuming full-rate GSM (eight time slots per frame), up to four full-duplex voice circuits can be supported by one TDD carrier. As shown in FIG. 5, the ATC 140 transmits to the radiotelephone 120b over, for example, time slot number 0. The radiotelephone 120b receives and replies back to the ATC 140 over, for example, time slot number 4. Time slots number 1 and 5 may be used to establish communications with another radiotelephone, and so on.

A Broadcast Control CHannel (BCCH) is preferably transmitted from the ATC 140 in standard mode, using a carrier frequency from below any guard band exclusion region. In other embodiments, a BCCH also can be defined using a TDD carrier. In any of these embodiments, radiotelephones in idle mode can, per established GSM methodology, monitor the BCCH and receive system-level and paging information. When a radiotelephone is paged, the system decides what type of resource to allocate to the radiotelephone in order to establish the communications link. Whatever type of resource is allocated for the radiotelephone communications channel (TDD mode or standard mode), the information is communicated to the radiotelephone, for example as part of the call initialization routine, and the radiotelephone configures itself appropriately.

It may be difficult for the TDD mode to co-exist with the standard mode over the same ATC, due, for example, to the ATC receiver LNA stage. In particular, assuming a mixture of standard and TDD mode GSM carriers over the same ATC, during the part of the frame when the TDD carriers are used to serve the forward link (when the ATC is transmitting TDD) enough energy may leak into the receiver front end of the same ATC to desensitize its LNA stage.

Techniques can be used to suppress the transmitted ATC energy over the 1600 MHz portion of the band from desensitizing the ATC's receiver LNA, and thereby allow mixed standard mode and TDD frames. For example, isolation between outbound and inbound ATC front ends and/or antenna system return loss may be increased or maximized. A switchable band-reject filter may be placed in front of the LNA stage. This filter would be switched in the receiver chain (prior to the LNA) during the part of the frame when the ATC is transmitting TDD, and switched out during the rest of the time. An adaptive interference canceller can be configured at RF (prior to the LNA stage). If such techniques are used, suppression of the order of 70 dB can be attained, which may allow mixed standard mode and TDD frames. However, the ATC complexity and/or cost may increase.

Thus, even though ATC LNA desensitization may be reduced or eliminated, it may use significant special engineering and attention and may not be economically worth the effort. Other embodiments, therefore, may keep TDD ATCs pure TDD, with the exception, perhaps, of the BCCH carrier which may not be used for traffic but only for broadcasting over the first part of the frame, consistent with TDD protocol. Moreover, Random Access CHannel (RACH) bursts may be timed so that they arrive at the ATC during the second half of the TDD frame. In some embodiments, all TDD ATCs may be equipped to enable reconfiguration in response to a command.

It is well recognized that during data communications or other applications, the forward link may use transmissions at higher rates than the return link. For example, in web browsing with a radiotelephone, mouse clicks and/or other user selections typically are transmitted from the radiotelephone to the system. The system, however, in response to a user selection, may have to send large data files to the radiotelephone. Hence, other embodiments of the invention may be configured to enable use of an increased or maximum number of time slots per forward GSM carrier frame, to provide a higher downlink data rate to the radiotelephones.

Thus, when a carrier frequency is configured to provide service in TDD mode, a decision may be made as to how many slots will be allocated to serving the forward link, and how many will be dedicated to the return link. Whatever the decision is, it may be desirable that it be adhered to by all TDD carriers used by the ATC, in order to reduce or avoid the LNA desensitization problem described earlier. In voice communications, the partition between forward and return link slots may be made in the middle of the frame as voice activity typically is statistically bidirectionally symmetrical. Hence, driven by voice, the center of the frame may be where the TDD partition is drawn.

To increase or maximize forward link throughput in data mode, data mode TDD carriers according to embodiments of the invention may use a more spectrally efficient modulation and/or protocol, such as the EDGE modulation and/or protocol, on the forward link slots. The return link slots may be based on a less spectrally efficient modulation and/or protocol such as the GPRS (GMSK) modulation and/or protocol. The EDGE modulation/protocol and the GPRS modulation/protocol are well known to those having skill in the art, and need not be described further herein. Given an EDGE forward/GPRS return TDD carrier strategy, up to (384/2)=192 kbps may be supported on the forward link while on the return link the radiotelephone may transmit at up to (115/2)≈64 kbps.

In other embodiments, it also is possible to allocate six time slots of an eight-slot frame for the forward link and only two for the return link. In these embodiments, for voice services, given the statistically symmetric nature of voice, the return link vocoder may need to be comparable with quarter-rate GSM, while the forward link vocoder can operate at full-rate GSM, to yield six full-duplex voice circuits per GSM TDD-mode carrier (a voice capacity penalty of 25%). Subject to this non-symmetrical partitioning strategy, data rates of up to (384)(6/8)=288 kbps may be achieved on the forward link, with up to (115)(2/8)≈32 kbps on the return link.

Figure 6:
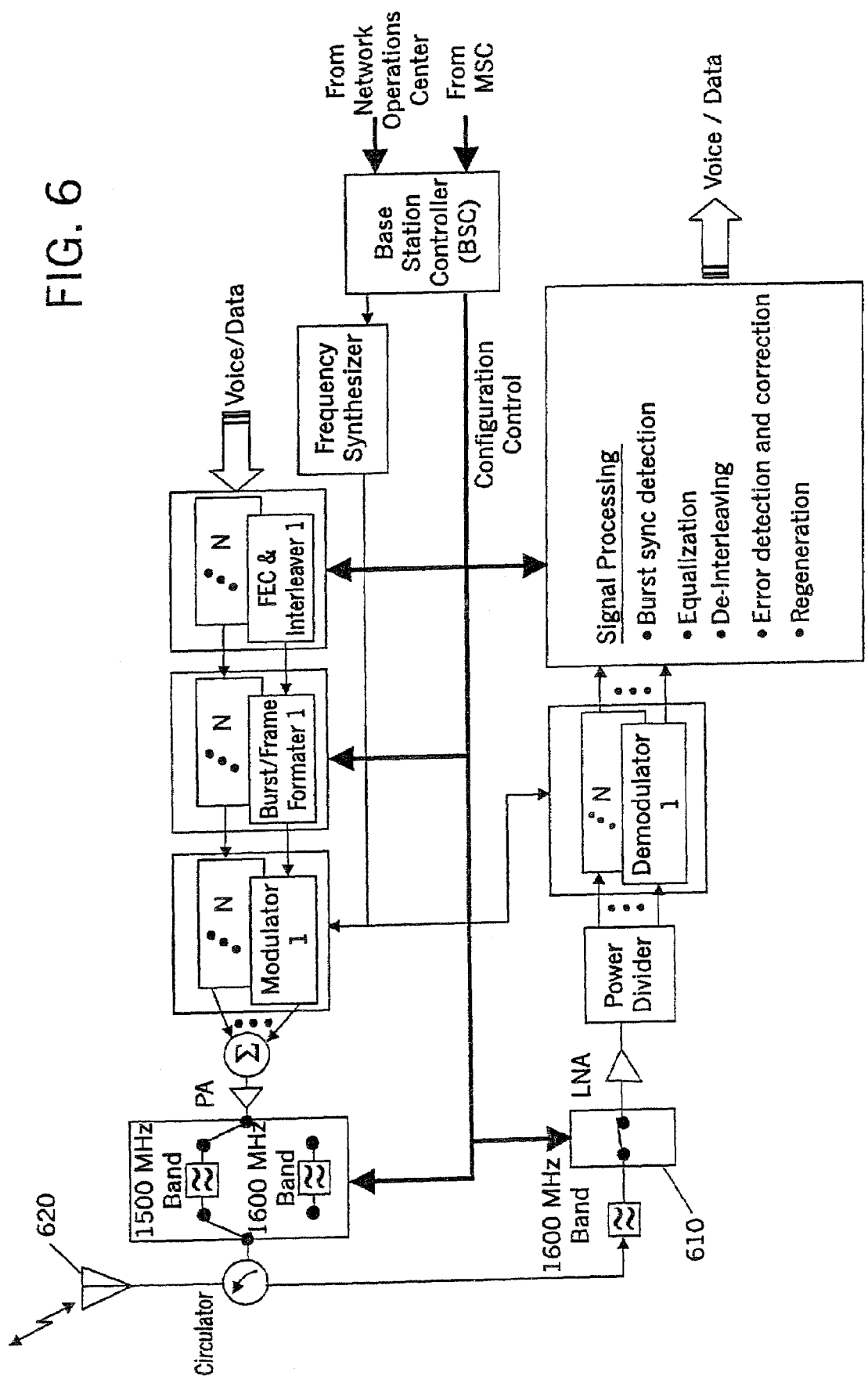
FIG. 6 is a block diagram of architectures of ancillary terrestrial components according to embodiments of the invention.

FIG. 6 depicts an ATC architecture according to embodiments of the invention, which can lend itself to automatic configuration between the two modes of standard GSM and TDD GSM on command, for example, from a Network Operations Center (NOC) via a Base Station Controller (BSC). It will be understood that in these embodiments, an antenna 620 can correspond to the antenna 140*a* of FIGS. 1 and 4, and the remainder of FIG. 6 can correspond to the electronics system 140*b* of FIGS. 1 and 4. If a reconfiguration command for a particular carrier, or set of carriers, occurs while the carrier(s) are active and are supporting traffic, then, via the in-band signaling Fast Associated Control CHannel (FACCH), all affected radiotelephones may be notified to also reconfigure themselves and/or switch over to new resources. If carrier(s) are reconfigured from TDD mode to standard mode, automatic reassignment of the carrier(s) to the appropriate standard-mode ATCs, based, for example, on capacity demand and/or reuse pattern can be initiated by the NOC. If, on the other hand, carrier(s) are reconfigured from standard mode to TDD mode, automatic reassignment to the appropriate TDD-mode ATCs can take place on command from the NOC.

Still referring to FIG. 6, a switch 610 may remain closed when carriers are to be demodulated in the standard mode. In TDD mode, this switch 610 may be open during the first half of the frame, when the ATC is transmitting, and closed during the second half of the frame, when the ATC is receiving. Other embodiments also may be provided.

FIG. 6 assumes N transceivers per ATC sector, where N can be as small as one, since a minimum of one carrier per sector generally is desired. Each transceiver is assumed to operate over one GSM carrier pair (when in standard mode) and can thus support up to eight full-duplex voice circuits, neglecting BCCH channel overhead. Moreover, a standard GSM carrier pair can support sixteen full-duplex voice circuits when in half-rate GSM mode, and up to thirty two full-duplex voice circuits when in quarter-rate GSM mode.

Figure 7:
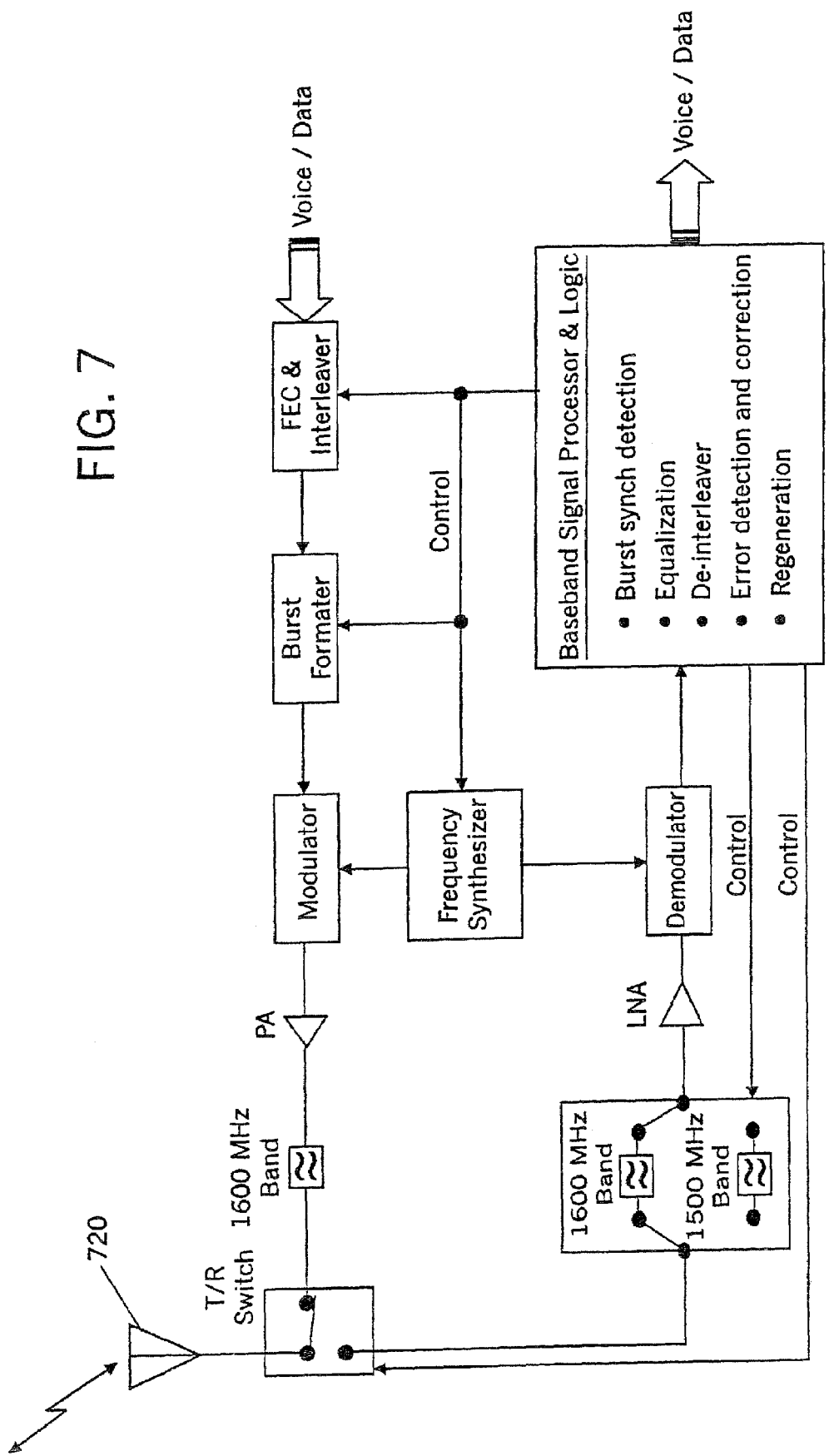
FIG. 7 is a block diagram of architectures of reconfigurable radiotelephones according to embodiments of the invention.

When in TDD mode, the number of full duplex voice circuits may be reduced by a factor of two, assuming the same vocoder. However, in TDD mode, voice service can be offered via the half-rate GSM vocoder with almost imperceptible quality degradation, in order to maintain invariant voice capacity. FIG. 7 is a block diagram of a reconfigurable radiotelephone architecture that can communicate with a reconfigurable ATC architecture of FIG. 6. In FIG. 7, an antenna 720 is provided, and the remainder of FIG. 7 can provide embodiments of an electronics system for the radiotelephone.

It will be understood that the ability to reconfigure ATCs and radiotelephones according to embodiments of the invention may be obtained at a relatively small increase in cost. The cost may be mostly in Non-Recurring Engineering (NRE) cost to develop software. Some recurring cost may also be incurred, however, in that at least an additional RF filter and a few electronically controlled switches may be used per ATC and radiotelephone. All other hardware/software can be common to standard-mode and TDD-mode GSM.

Referring now to FIG. 8, other radiotelephone systems and methods according to embodiments of the invention now will be described. In these embodiments, the modified second range of satellite band forward link frequencies includes a plurality of frequencies in the second range of satellite band forward link frequencies that are transmitted by the ATCs to the radiotelephones at a power level, such as maximum power level, that monotonically decreases as a function of (increasing) frequency. More specifically, as will be described below, in some embodiments, the modified second range of satellite band forward link frequencies includes a subset of frequencies proximate to a first or second end of the range of satellite band forward link frequencies that are transmitted by the ATC to the radiotelephones at a power level, such as a maximum power level, that monotonically decreases toward the first or second end of the second range of satellite band forward link frequencies. In still other embodiments, the first range of satellite band return link frequencies is contained in an L-band of satellite frequencies above GPS frequencies and the second range of satellite band forward link frequencies is contained in the L-band of satellite frequencies below the GPS frequencies. The modified second range of satellite band forward link frequencies includes a subset of frequencies proximate to an end of the second range of satellite band forward link frequencies adjacent the GPS frequencies that are transmitted by the ATC to the radiotelephones at a power level, such as a maximum power level, that monotonically decreases toward the end of the second range of satellite band forward link frequencies adjacent the GPS frequencies.

Without being bound by any theory of operation, a theoretical discussion of the mapping of ATC maximum power levels to carrier frequencies according to embodiments of the present invention now will be described. Referring to FIG. 8, let $v=\mathcal{F}(\rho)$ represent a mapping from the power ($\rho$) domain to the frequency ($v$) range. The power ($\rho$) is the power that an ATC uses or should transmit in order to reliably communicate with a given radiotelephone. This power may depend on many factors such as the radiotelephone's distance from the ATC, the blockage between the radiotelephone and the ATC, the level of multipath fading in the channel, etc., and as a result, will, in general, change as a function of time. Hence, the power used generally is determined adaptively (iteratively) via closed-loop power control, between the radiotelephone and ATC.

The frequency ($v$) is the satellite carrier frequency that the ATC uses to communicate with the radiotelephone. According to embodiments of the invention, the mapping $\mathcal{F}$ is a monotonically decreasing function of the independent variable $\rho$. Consequently, in some embodiments, as the maximum ATC power increases, the carrier frequency that the ATC uses to establish and/or maintain the communications link decreases. FIG. 8 illustrates an embodiment of a piece-wise continuous monotonically decreasing (stair-case) function. Other monotonic functions may be used, including linear and/or nonlinear, constant and/or variable decreases. FACCH or Slow Associated Control CHannel (SACCH) messaging may be used in embodiments of the invention to facilitate the mapping adaptively and in substantially real time.

FIG. 9 depicts an ideal cell according to embodiments of the invention, where, for illustration purposes, three power regions and three associated carrier frequencies (or carrier frequency sets) are being used to partition a cell. For simplicity, one ATC transmitter at the center of the idealized cell is assumed with no sectorization. In embodiments of FIG. 9, the frequency (or frequency set) $f_I$ is taken from substantially the upper-most portion of the L-band forward link frequency set, for example from substantially close to 1559 MHz (see FIG. 3). Correspondingly, the frequency (or frequency set) $f_M$ is taken from substantially the central portion of the L-band forward link frequency set (see FIG. 3). In concert with the above, the frequency (or frequency set) $f_O$ is taken from substantially the lowest portion of the L-band forward link frequencies, for example close to 1525 MHz (see FIG. 3).

Thus, according to embodiments of FIG. 9, if a radiotelephone is being served within the outer-most ring of the cell, that radiotelephone is being served via frequency $f_O$. This radiotelephone, being within the furthest area from the ATC, has (presumably) requested maximum (or near maximum) power output from the ATC. In response to the maximum (or near maximum) output power request, the ATC uses its a priori knowledge of power-to-frequency mapping, such as a three-step staircase function of FIG. 9. Thus, the ATC serves the radiotelephone with a low-value frequency taken from the lowest portion of the mobile L-band forward link frequency set, for example, from as close to 1525 MHz as possible. This, then, can provide additional safeguard to any GPS receiver unit that may be in the vicinity of the ATC.

Embodiments of FIG. 9 may be regarded as idealized because they associate concentric ring areas with carrier frequencies (or carrier frequency sets) used by an ATC to serve its area. In reality, concentric ring areas generally will not be the case. For example, a radiotelephone can be close to the ATC that is serving it, but with significant blockage between the radiotelephone and the ATC due to a building. This radiotelephone, even though relatively close to the ATC, may also request maximum (or near maximum) output power from the ATC. With this in mind, FIG. 10 may depict a more realistic set of area contours that may be associated with the frequencies being used by the ATC to serve its territory, according to embodiments of the invention. The frequency (or frequency set) $f_I$ may be reused in the immediately adjacent ATC cells owing to the limited geographical span associated with $f_I$ relative to the distance between cell centers. This may also hold for $f_M$.

Figure 11:
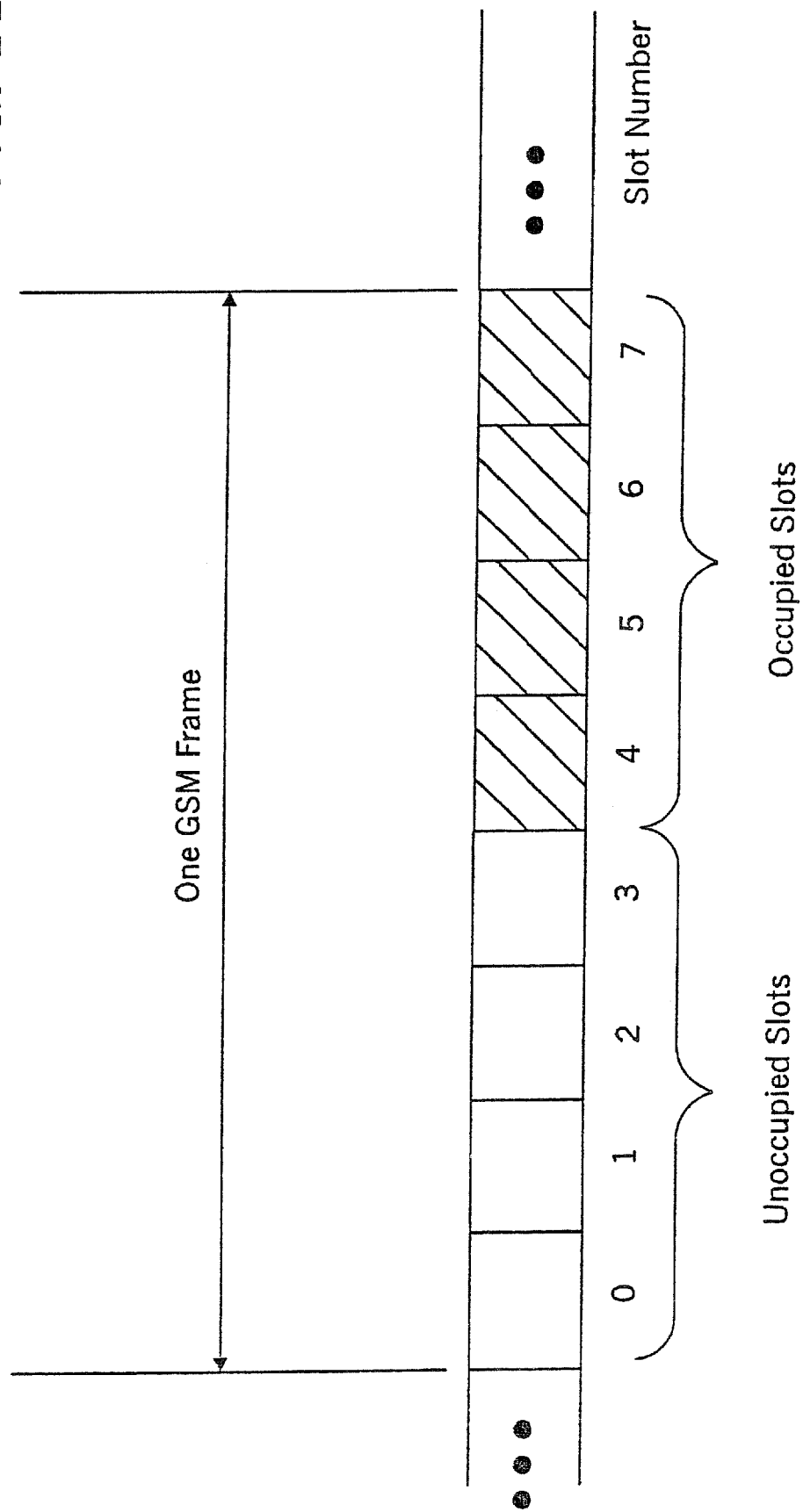
FIG. 11 illustrates two or more contiguous slots in a frame that are unoccupied according to embodiments of the present invention.

Referring now to FIG. 11, other modified second ranges of satellite band forward link frequencies that can be used by ATCs according to embodiments of the present invention now will be described. In these embodiments, at least one frequency in the modified second range of satellite band forward link frequencies that is transmitted by the ATC to the radiotelephones comprises a frame including a plurality of slots. In these embodiments, at least two contiguous slots in the frame that is transmitted by the ATC to the radiotelephones are left unoccupied. In other embodiments, three contiguous slots in the frame that is transmitted by the ATC to the radiotelephones are left unoccupied. In yet other embodiments, at least two contiguous slots in the frame that is transmitted by the ATC to the radiotelephones are transmitted at lower power than remaining slots in the frame. In still other embodiments, three contiguous slots in the frame that is transmitted by the ATC to the radiotelephones are transmitted at lower power than remaining slots in the frame. In yet other embodiments, the lower power slots may be used with first selected ones of the radiotelephones that are relatively close to the ATC and/or are experiencing relatively small signal blockage, and the remaining slots are transmitted at higher power to second selected ones of the radiotelephones that are relatively far from the ATC and/or are experiencing relatively high signal blockage.

Stated differently, in accordance with some embodiments of the invention, only a portion of the TDMA frame is utilized. For example, only the first four (or last four, or any contiguous four) time slots of a full-rate GSM frame are used to support traffic. The remaining slots are left unoccupied (empty). In these embodiments, capacity may be lost. However, as has been described previously, for voice services, half-rate and even quarter-rate GSM may be invoked to gain capacity back, with some potential degradation in voice quality. The slots that are not utilized preferably are contiguous, such as slots 0 through 3 or 4 through 7 (or 2 through 5, etc.). The use of non-contiguous slots such as 0, 2, 4, and 6, for example, may be less desirable. FIG. 11 illustrates four slots (4-7) being used and four contiguous slots (0-3) being empty in a GSM frame.

It has been found experimentally, according to these embodiments of the invention, that GPS receivers can perform significantly better when the interval between interference bursts is increased or maximized. Without being bound by any theory of operation, this effect may be due to the relationship between the code repetition period of the GPS C/A code (1 msec) and the GSM burst duration (about 0.577 msec). With a GSM frame occupancy comprising alternate slots, each GPS signal code period can experience at least one "hit", whereas a GSM frame occupancy comprising four to five contiguous slots allows the GPS receiver to derive sufficient clean information so as to "flywheel" through the error events.

Figure 12:
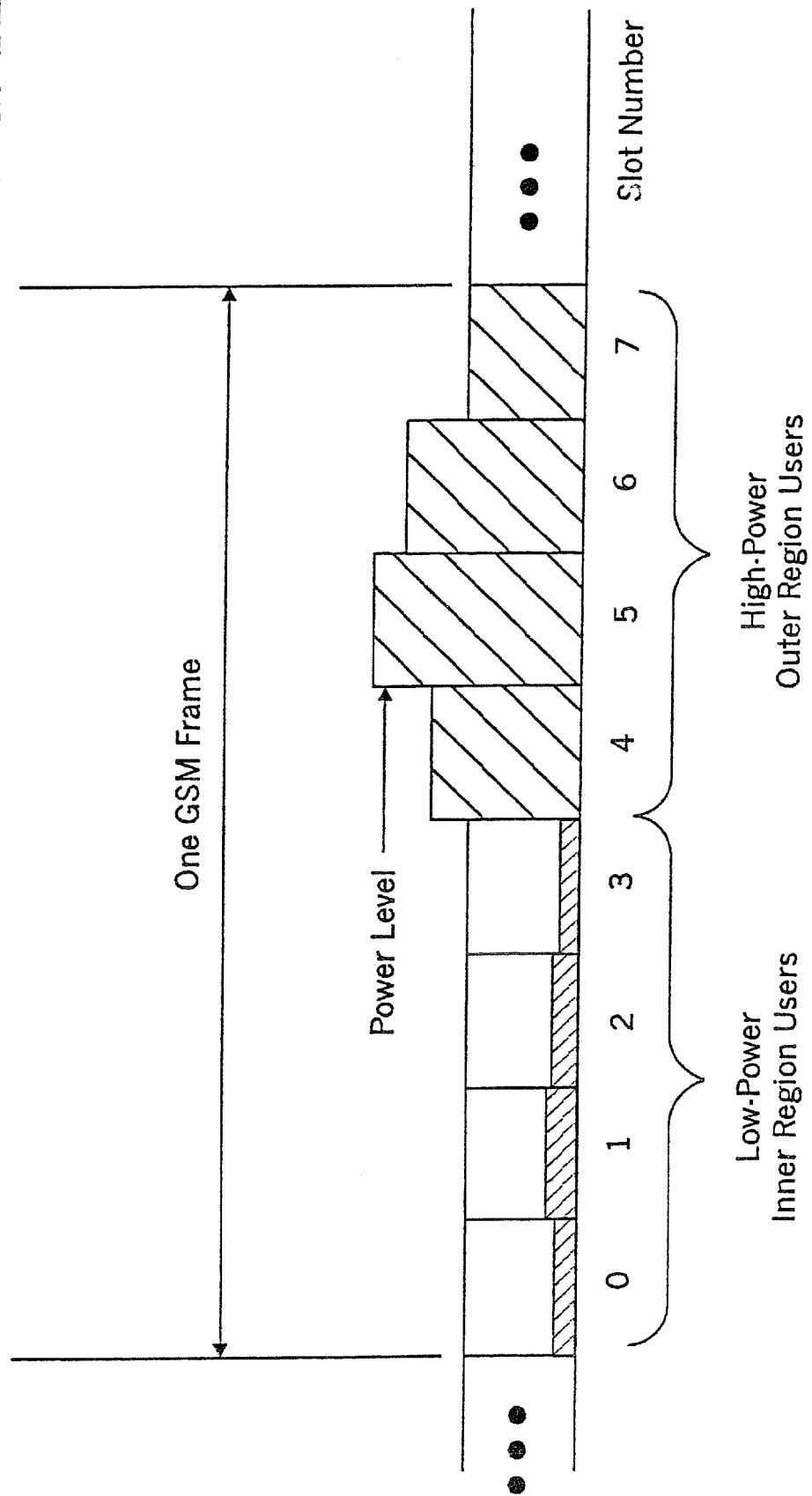
FIG. 12 illustrates loading of two or more contiguous slots with lower power transmissions according to embodiments of the present invention.

According to other embodiments of the invention, embodiments of FIGS. 8-10 can be combined with embodiments of FIG. 11. Furthermore, according to other embodiments of the invention, if an $f_I$ carrier of FIG. 9 or 10 is underutilized, because of the relatively small footprint of the inner-most region of the cell, it may be used to support additional traffic over the much larger outermost region of the cell. Thus, for example, assume that only the first four slots in each frame of $f_I$ are being used for inner region traffic. In embodiments of FIGS. 8-10, these four $f_I$ slots are carrying relatively low power bursts, for example of the order of 100 mW or less, and may, therefore, appear as (almost) unoccupied from an interference point of view. Loading the remaining four (contiguous) time slots of $f_I$ with relatively high-power bursts may have negligible effect on a GPS receiver because the GPS receiver would continue to operate reliably based on the benign contiguous time interval occupied by the four low-power GSM bursts. FIG. 12 illustrates embodiments of a frame at carrier $f_I$ supporting four low-power (inner interval) users and four high-power (outer interval) users. In fact, embodiments illustrated in FIG. 12 may be a preferred strategy for the set of available carrier frequencies that are closest to the GPS band. These embodiments may avoid undue capacity loss by more fully loading the carrier frequencies.

The experimental finding that interference from GSM carriers can be relatively benign to GPS receivers provided that no more than, for example, 5 slots per 8 slot GSM frame are used in a contiguous fashion can be very useful. It can be particularly useful since this experimental finding may hold even when the GSM carrier frequency is brought very close to the GPS band (as close as 1558.5 MHz) and the power level is set relatively high. For example, with five contiguous time slots per frame populated, the worst-case measured GPS receiver may attain at least 30 dB of desensitization margin, over the entire ATC service area, even when the ATC is radiating at 1558.5 MHz. With four contiguous time slots per frame populated, an additional 10 dB desensitization margin may be gained for a total of 40 dB for the worst-case measured GPS receiver, even when the ATC is radiating at 1558.5 MHz.

There still may be concern about the potential loss in network capacity (especially in data mode) that may be incurred over the frequency interval where embodiments of FIG. 11 are used to underpopulate the frame. Moreover, even though embodiments of FIG. 12 can avoid capacity loss by fully loading the carrier, they may do so subject to the constraint of filling up the frame with both low-power and high-power users. Moreover, if forward link carriers are limited to 5 contiguous high power slots per frame, the maximum forward link data rate per carrier that may be aimed at a particular user may become proportionately less.

Therefore, in other embodiments, carriers which are subject to contiguous empty/low power slots are not used for the forward link. Instead, they are used for the return link. Consequently, in some embodiments, at least part of the ATC is configured in reverse frequency mode compared to the SBC in order to allow maximum data rates over the forward link throughout the entire network. On the reverse frequency return link, a radiotelephone may be limited to a maximum of 5 slots per frame, which can be adequate for the return link. Whether the five available time slots per frame, on a reverse frequency return link carrier, are assigned to one radiotelephone or to five different radiotelephones, they can be assigned contiguously in these embodiments. As was described in connection with FIG. 12, these five contiguous slots can be assigned to high-power users while the remaining three slots may be used to serve low-power users.

Other embodiments may be based on operating the ATC entirely in reverse frequency mode compared to the SBC. In these embodiments, an ATC transmits over the satellite return link frequencies while radiotelephones respond over the satellite forward link frequencies. If sufficient contiguous spectrum exists to support CDMA technologies, and in particular the emerging Wideband-CDMA 3G standard, the ATC forward link can be based on Wideband-CDMA to increase or maximize data throughput capabilities. Interference with GPS may not be an issue since the ATCs transmit over the satellite return link in these embodiments. Instead, interference may become a concern for the radiotelephones. Based, however, on embodiments of FIGS. 11-12, the radiotelephones can be configured to transmit GSM since ATC return link rates are expected, in any event, to be lower than those of the forward link. Accordingly, the ATC return link may employ GPRS-based data modes, possibly even EDGE. Thus, return link carriers that fall within a predetermined frequency interval from the GPS band-edge of 1559 MHz, can be under loaded, per embodiments of FIG. 11 or 12, to satisfy GPS interference concerns.

Finally, other embodiments may use a partial or total reverse frequency mode and may use CDMA on both forward and return links. In these embodiments, the ATC forward link to the radiotelephones utilizes the frequencies of the satellite return link (1626.5 MHz to 1660.5 MHz) whereas the ATC return link from the radiotelephones uses the frequencies of the satellite forward link (1525 MHz to 1559 MHz). The ATC forward link can be based on an existing or developing CDMA technology (e.g., IS-95, Wideband-CDMA, etc.). The ATC network return link can also be based on an existing or developing CDMA technology provided that the radiotelephone's output is gated to cease transmissions for approximately 3 msec once every T msec. In some embodiments, T will be greater than or equal to 6 msec.

This gating may not be needed for ATC return link carriers at approximately 1550 MHz or below. This gating can reduce or minimize out-of-band interference (desensitization) effects for GPS receivers in the vicinity of an ATC. To increase the benefit to GPS, the gating between all radiotelephones over an entire ATC service area can be substantially synchronized. Additional benefit to GPS may be derived from system-wide synchronization of gating. The ATCs can instruct all active radiotelephones regarding the gating epoch. All ATCs can be mutually synchronized via GPS.

Figure 13:
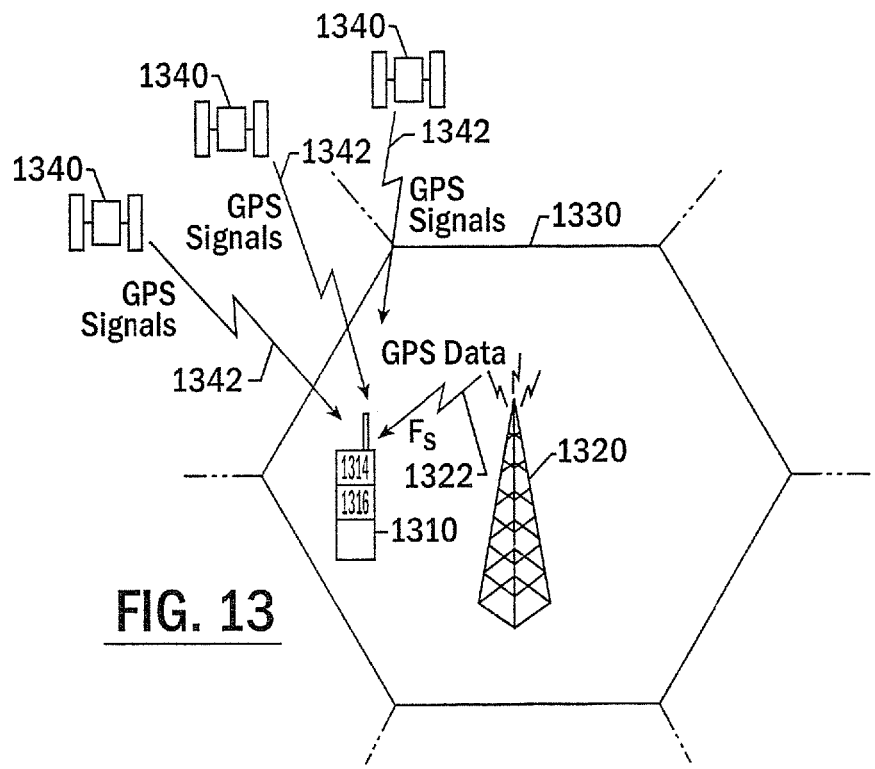
FIG. 13 illustrates cellular wireless communications systems and methods, including terrestrial wireless networks, mobile terminals and associated methods according to some embodiments of the present invention.

Network-Assisted Global Positioning Systems, Methods and Terminals Including Doppler Shift Estimates FIG. 13 illustrates cellular wireless communications systems and methods, including wireless networks, mobile terminals and associated methods according to some embodiments of the present invention. As shown in FIG. 13, these cellular wireless communications systems and methods may communicate with one or more mobile terminals 1310 via a plurality of cells 1330 served by a terrestrial wireless network that includes a plurality of terrestrial base stations 1320. Although only one cell 1330 is shown in FIG. 13, a typical cellular wireless communications system/method may comprise hundreds of cells and may serve thousands of mobile terminals 1310. It also will be understood by those having skill in the art that, in some embodiments of the present invention, the cells 1330 may correspond to cells of an Ancillary Terrestrial Network (ATN), as were described in the preceding section, the terrestrial base stations 1320 may correspond to an Ancillary Terrestrial Component (ATC) 140 in an ancillary terrestrial network, as was described in the preceding section, and the mobile terminals 1310 may correspond to a radiotelephone 120, as was described in the preceding section.

Still referring to FIG. 13, the terrestrial wireless network including the plurality of cells 1330 and the plurality of terrestrial base stations 1320, are configured to transmit wireless communications including GPS data 1322 over a satellite frequency band $F_s$, such as one or more portions of the L-band satellite frequency spectrum illustrated in FIG. 3. In some embodiments, the satellite frequency band $F_s$ is outside the GPS frequency band illustrated in FIG. 3. The mobile terminal 1310 is configured to receive the wireless communications including the GPS data 1322 from the terrestrial wireless network, including the terrestrial base station 1320, over the satellite frequency band $F_s$, for example using a receiver of a transceiver (transmitter/receiver) 1314. The mobile terminal 1310 also is configured to receive GPS signals 1342 from a plurality, shown in FIG. 13 as three, of GPS satellites 1340. The mobile terminal 1310 also is configured to perform pseudo-range measurements using the GPS signals 1342 that are received from the GPS satellites 1340 and the GPS data 1322 that is received over the satellite frequency band $F_s$, for example, using a processor 1316. Accordingly, a satellite frequency band is used terrestrially to provide GPS assist to a mobile terminal. It also will be understood that, in some embodiments, the terrestrial base station 1320 is a terrestrial base station of a conventional terrestrial cellular communications system that uses at least one satellite frequency band $F_s$ for transmission.

Figure 14:
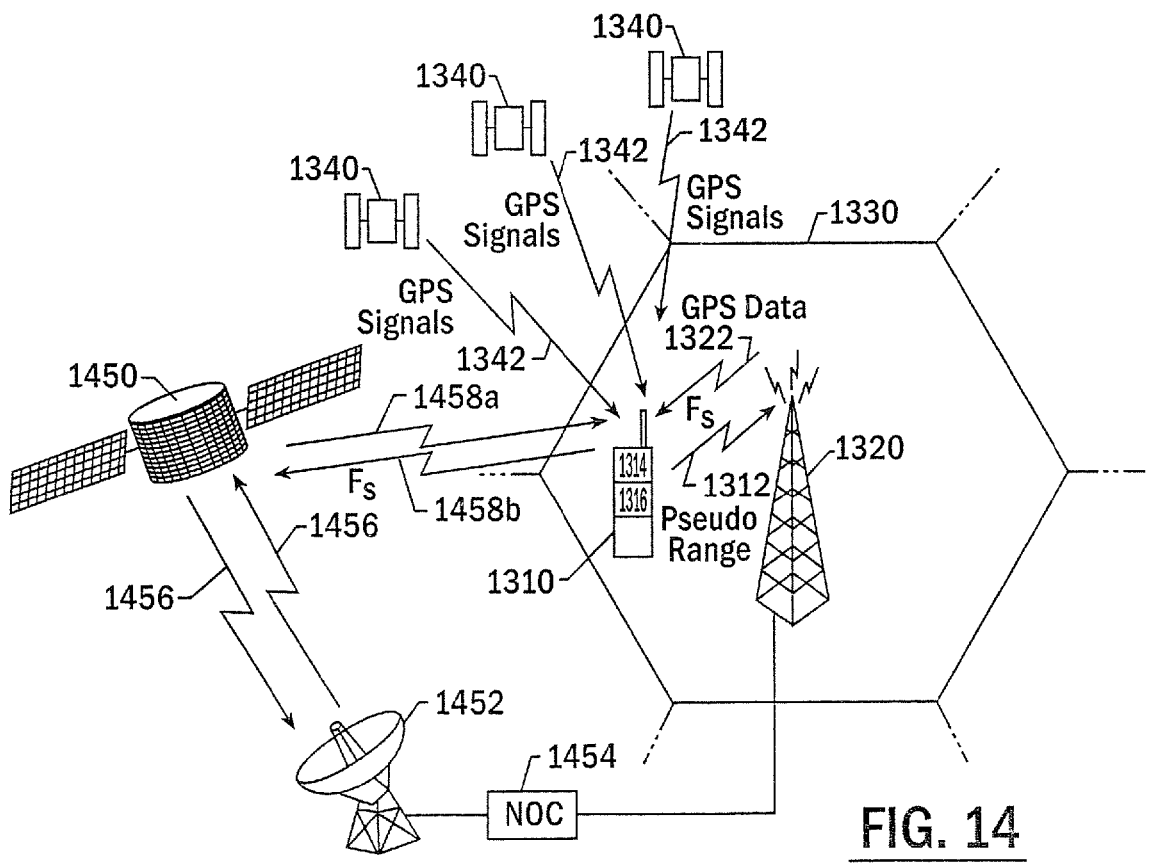
FIG. 14 illustrates cellular wireless communications systems and methods, including terrestrial wireless networks, mobile terminals and associated methods according to other embodiments of the present invention.

FIG. 14 illustrates cellular wireless communications systems and methods including wireless networks, mobile terminals and associated methods according to other embodiments of the present invention. Referring now to FIG. 14, these embodiments of the present invention also include a network operations center (NOC) 1454 that is connected to the terrestrial base stations 1320, either directly or via one or more intermediary network elements, such as a Mobile Telephone Switching Office (MTSO). As shown in FIG. 14, in some embodiments, the mobile terminal 1310 is further configured to transmit the pseudo-range measurements 1312 to the network operations center 1454 via the terrestrial base station 1320, using a terrestrial cellular frequency band, a satellite cellular frequency band and/or any other frequency band. The network operations center 1454 is configured to receive the pseudo-range measurements 1312, and to determine a position of the mobile terminal 1310 using the pseudo-range measurements 1312. Accordingly, in some embodiments, as shown in FIG. 14, the mobile terminal 1310 is configured to transmit the pseudo-range measurements 1312 to the network operation center 1454 via the terrestrial wireless network, including the terrestrial base stations 1320.

In still other embodiments of the present invention, as also illustrated in FIG. 14, a space-based component 1450 also is included that is configured to wirelessly communicate with the mobile terminal 1310 over the satellite frequency band $F_s$. A feeder link 1456 is used for communications between the space-based component 1450 and a gateway 1452. The gateway 1452 may be connected to the network operations center 1454 either directly or via one or more intermediary network elements. A service link also is provided for transmission from the space-based component 1450 to the mobile terminal 1310 via a forward service link 1458a, and to receive communications from the mobile terminal 1310 via a return service link 1458b. Moreover, in some embodiments, the mobile terminal is configured to transmit the pseudo-range measurements to the network operation center 1454 via the return service link 1458b, the space-based component 1450, the feeder link 1456, and the gateway 1452. In still other embodiments, combinations of the terrestrial base stations 1320 and the space-based component 1450 may be used to receive the pseudo-range measurements from the mobile terminal 1310 and to transmit the pseudo-range measurements to the network operations center 1454.

Figure 15:
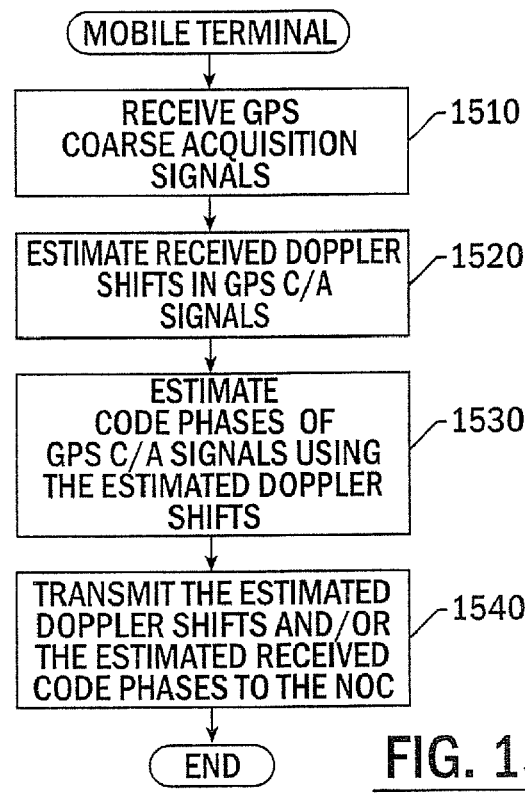
FIG. 15 is a flowchart of operations that may be performed by a mobile terminal according to some embodiments of the present invention.

FIG. 15 is a flowchart of operations that may be performed by a mobile terminal, such as a mobile terminal 1310 of FIG. 13 or 14, to provide terrestrial wireless network-assisted GPS measurements. It will be understood by those having skill in the art that these operations may be performed, for example, by the radio frequency transceiver 1314 and the processor 1316 that is included in mobile terminals 1310.

It also will be understood by those having skill in the art that the operations of FIG. 15 may be performed based on GPS data from a wireless network that may be a terrestrial and/or satellite wireless network using terrestrial and/or satellite frequency bands. Accordingly, embodiments of the present invention that are described in FIG. 15 may be performed independent of the use of a satellite frequency band by a terrestrial wireless network, to convey GPS data to the mobile terminal.

Referring now to FIG. 15, at Block 1510, GPS C/A signals are received at the mobile terminal such as the mobile terminal 1310, for example as part of the GPS signals 1342 that are received from the plurality of GPS satellites 1340. At Block 1520, the processor of the mobile terminal, such as the processor 1316 of the mobile terminal 1310, estimates the Doppler shift in the C/A signals. At Block 1530, the received code phases of the GPS C/A signals are then estimated using the estimated Doppler shifts that were obtained at Block 1520. Finally, at Block 1540, the estimated Doppler shifts and/or the estimated received code phases are transmitted by the mobile terminal, for example as part of the transmission of pseudo-range measurements 1312, to the network operations center (NOC) 1454 using the terrestrial base stations 1320 and/or the space-based component 1450, over a satellite, terrestrial and/or other frequency band, as was described above. Accordingly, the estimated Doppler shifts (Block 1520) are used to estimate the received code phases of the GPS C/A signals (Block 1530). This can reduce the amount of signal processing used to estimate the received code phases of the GPS C/A signals.

It will be understood that in some embodiments of the present invention, operations of FIG. 15 may be performed by a mobile terminal that includes a GPS processor and a cellular data transceiver (but not a cellular voice transceiver) therein, wherein the estimated Doppler shifts are used by a GPS processor to reduce the amount of signal processing to estimate the received code phases of the GPS C/A signals. In other embodiments of FIG. 15, the mobile terminal may include a GPS receiver, a terrestrial cellular voice and data transceiver and/or a satellite cellular voice and data transceiver. In some of these embodiments, the mobile terminal may be configured to operate in conjunction with an ancillary terrestrial network, as was described above.

Figure 16:
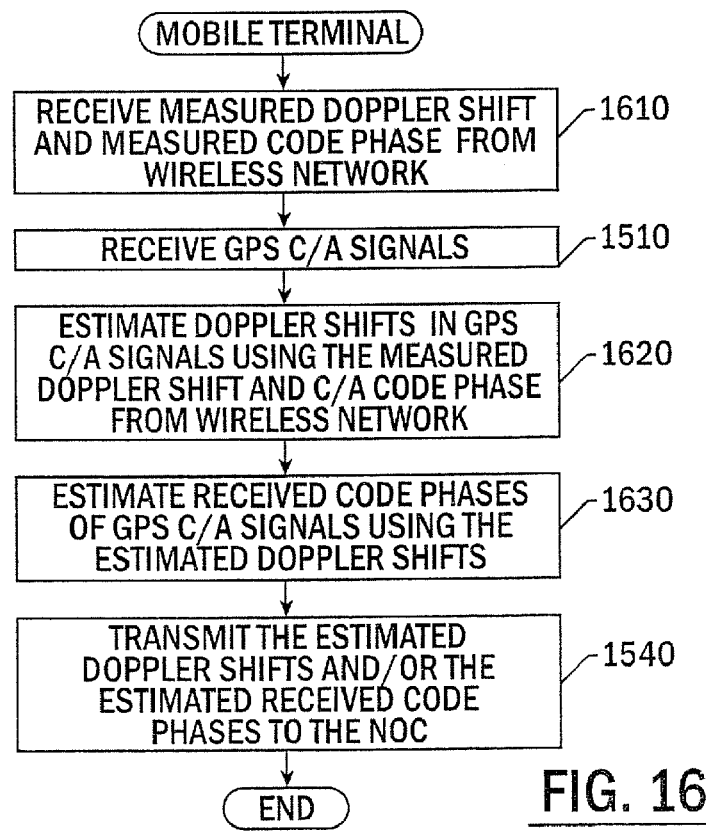
FIG. 16 is a flowchart of operations that may be performed by a mobile terminal according to other embodiments of the present invention.

FIG. 16 is a flowchart of other operations that may be performed in the mobile terminal 1310 according to other embodiments of the present invention. These embodiments use GPS data, such as the GPS data 1322 of FIG. 13 or 14, that may be received from a wireless network, such as the terrestrial wireless networks of FIG. 13 or 14 and/or a satellite wireless network, to allow the computations for computing the estimated code phases of the GPS signals to be reduced.

In particular, referring to FIG. 16, at Block 1610, the measured Doppler shifts and measured code phases are received from the terrestrial and/or satellite wireless network. These parameters may be received as part of the GPS data 1322 that is conveyed from the terrestrial wireless network of FIG. 13 or 14 and/or a satellite wireless network. At Block 1510, the GPS C/A signals are received, as was already described. At Block 1620, Doppler shifts in the GPS C/A signals are estimated using the measured Doppler shifts and C/A code phases conveyed from the wireless network. Then, at Block 1630, the code phases of the received GPS C/A signals are estimated using the estimated Doppler shifts of Block 1620. Finally, at Block 1540, the estimated Doppler shift and/or the estimated received code phases are transmitted to the NOC. The NOC can compute a position fix and transmit the position of the mobile terminal to the mobile terminal.

It will be understood that in some embodiments of the present invention, operations of FIG. 16 may be performed, for example, by a mobile terminal that includes a GPS receiver, a terrestrial cellular transceiver and/or a satellite cellular transceiver for receiving the measured Doppler shifts and the measured code phases from a terrestrial wireless network. In still other embodiments, the operations of FIG. 16 may be performed in connection with an ancillary terrestrial network, as was described above. In yet other embodiments, the operations of FIG. 16 may be performed in connection with a satellite and/or terrestrial wireless network, as was described above.

Some embodiments of the present invention can support both outdoor and in-building position reporting for mobile terminals 1310 communicating with a terrestrial base station 1320 such as an ATC and/or communicating with a satellite wireless network using terrestrial and/or satellite wireless frequency bands. Some embodiments can exploit the relatively small size of the terrestrial network cells 1330 to reduce or minimize the computational requirements at the mobile terminal 1310, while reducing or minimizing the amount of pseudo-range data transferred to the NOC 1454. Some embodiments can preprocess the received GPS signals at the mobile terminal 1310, which can enable further computational reductions.

Some embodiments of the present invention can be applied to any cellular network architecture and/or local and/or wide area network architecture, wherein the base stations can comprise terrestrial cellular network base stations, ancillary terrestrial network base stations and/or access points of a wireless local and/or wide area network. In some embodiments, the cell sizes may be on the order of a few miles radius or less. Embodiments of the invention may also be used with cellular satellite-mode operation by providing mechanisms to determine the approximate location (for example within a few miles) of the mobile terminal within its assigned satellite beam.

Two embodiments for estimating an approximate mobile terminal position within the satellite beam will be described in detail below in connection with FIGS. 27-30.

In some embodiments of the invention, the Doppler shift and code phase of the received coarse/acquisition (C/A) signals 1342 from each GPS Satellite 1340, also referred to herein as a Space Vehicle (SV), are estimated at the mobile terminal 1310. The small cell size can be taken advantage of to reduce the maximum a priori uncertainty in these parameters as follows:

Reduced Code Phase Range: The C/A code is a repeating 1023-chip Gold Code sequence with chip rate of 1.023 Mcps. Thus, the chip "length" (relative to the speed of light) is 3.0e+8 m/s/1.023e+6=293.26 meters. Approximating the cell coverage as a flat circle of radius R, then the maximum range variation to the SV, denoted "$\Delta$", from the center of the cell to the cell edge is:

$$\Delta = R \cos(El), \text{ where El is the elevation angle to the SV.} \quad (1)$$

The code phase is the offset, in chip periods, of the received C/A Gold Code frame relative to the start of the frame, measured at a particular observation time. In this approach, each terrestrial base station, also referred to herein as a BTS, is equipped with a GPS receiver with which it can accurately measure the code phase of each C/A signal in view and download this information to the mobile terminal. Referring to Equation (1), for the worst-case elevation angle of 0° and a typical cell radius R of 1000 m, the value of $\Delta$ in terms of chip lengths is equal to 1000/293.26=3.41 chips. Since the BTS is typically located near the center of the cell, then the measured code phase at any location within the cell generally will lie within about ±4 chips of the code phase measured at the BTS. Code phase range uncertainty is thereby reduced.

Reduced Doppler Shift Range: By similar analysis to the above, the precise Doppler shift of the received C/A signal due to SV motion (which generally is the largest contributor to Doppler shift) is also measured at the BTS and downloaded to the mobile terminal. Because of the cell's small size compared to the distance to the GPS satellite, this Doppler shift component generally will be approximately the same for any location within the cell 1330. Thus, the Doppler frequency search at the mobile terminal can be reduced to just a small range about this known SV Doppler component. Any residual frequency offset (after subtracting out the SV Doppler shift), which may be referred to herein as "residual Doppler shift", will be primarily due to the Doppler shift caused by the motion of the mobile terminal, and may also possibly include any local oscillator frequency offset error and multi-path fading effects. This analysis assumes that the mobile terminal's local-oscillator is sufficiently accurate so that down-conversion frequency errors can be ignored.

Assume an operating scenario where the mobile terminal is inside a moving vehicle with no direct line-of-sight to any SV, which may approximate the signal-to-noise ratio of the in-building case. Then, the maximum residual Doppler shift due to the vehicle motion should be accommodated. Given a vehicle velocity v(m/s), it can be shown that the maximum residual Doppler shift $\Delta f_v$ due to vehicle motion is:

$$\Delta f_v (\text{Hz}) = f_{source} \cdot (\pm v/C) = 1.57542e+9 \cdot (\pm v/3.0e+8) \quad (2)$$

For a vehicle traveling at 60 ml/hr (26.8 m/sec) directly toward an SV located near the horizon (worst case), the Doppler shift due to vehicle motion $\Delta f_v$=141 Hz. Thus a residual Doppler search range of about +160 Hz should be accommodated for this case.

FIG. 17 is a block diagram of operations that may be performed in a mobile terminal, such as a mobile terminal 1310, according to some embodiments of the present invention. As shown in FIG. 17, received GPS signals 1342, that generally include noise, are received at a receiver RF section 1750 which may be part of a transceiver 1314. At Block 1710, a snapshot of time samples of the received GPS signals plus noise is collected, which may correspond to Block 1510 of FIG. 15. At Block 1720, the time samples are processed to estimate the Doppler shift of each received C/A signal, which may correspond to Block 1520 of FIG. 15. At Block 1730, the Doppler shift estimate from Block 1720 is used to reprocess the time samples to estimate the code phase of each received C/A signal, which may correspond to Block 1530 of FIG. 15. The code phase estimate and Doppler shift estimate are then transmitted to the NOC at Block 1740, which may correspond to Block 1540 of FIG. 15. As will be described in detail below, the determination of the Doppler shift in Block 1720 can allow for computationally efficient calculation of C/A code phase in Block 1730.

Upon collecting the received signal plus noise samples in Block 1710, the mobile terminal transmits to the NOC (for example, via the BTS 1320) the precise time at which the GPS signal samples in Block 1710 were measured. Using the SV ephemeris (carried by GPS signals 1342), the NOC 1454 (for example via the BTS 1320) informs the mobile terminal 1310 of which SVs 1340 were in view at the mobile terminal's approximate location at the time of its measurement in Block 1710. In some embodiments, before proceeding to Blocks 1720 and 1730, the mobile terminal downloads the following information from the BTS 1320 for each C/A signal to be processed:

1. The Doppler frequency shift due to SV motion measured at the BTS, corresponding to the mobile terminal's observation period. Since the BTS is not moving, this can simply be the total Doppler shift measured at the BTS. (See Block 1610.)
2. The code phase measured at the BTS corresponding to the mobile terminal's measurement time. (See Block 1610.)
3. The 50 bps ephemeris data bit sequence transmitted during the mobile's observation period. Each C/A signal is overlaid with 50 bps binary data whose bit transitions reverse the sign of the underlying Gold Code chips. Before the C/A signals are processed, the received samples are first multiplied by an exact replica of the 50 bps bit sequence to strip out this data modulation. To reduce processing time and/or for the in-building case, where the SV signal strength may be too low to allow the mobile to recover the 50 bps data directly from the received C/A signals, this data may be downloaded to the mobile from the BTS.

Embodiments of Blocks 1710, 1720 and 1730 in FIG. 17 now will be described in detail. Specific parameter values used herein are presently believed to be representative, based on computer simulation results.

FIG. 18 is a block diagram illustrating detailed embodiments of Block 1710 of FIG. 17. As shown in FIG. 18, the C/A signals are received and amplified by the mobile terminal receiver's RF section, Block 1750, then band-pass filtered at Block 1810 to increase or maximize received signal-to-noise ratio. After filtering, the signals plus received noise may be down-converted to the complex baseband at Block 1820, for example, using quadrature mixer components that separately down-convert the in-phase (I) and quadrature phase (Q) components. The baseband I and Q-outputs can be mathematically equated to a complex signal, for example, the complex envelope of the received signal (hence the term "complex baseband"), where the I-component is the real part, and the Q-component is the imaginary part. It should be noted that, in some embodiments, from this point onward, the signal flow actually may be comprised of parallel I- and Q-paths. The received C/A signals plus noise may be further filtered at Block 1825 and time-sampled at Block 1830, for example at a rate of 1.024 MHz, and then quantized at Block 1840, converting them from analog to discrete-time digital samples. Finally, a "snapshot" of received time samples "x(n)" is collected and stored in memory at Block 1850. For the in-building environment, analysis has shown that about 1-million time samples may be needed to reliably recover the weak C/A signals from the received noise. For this illustration, a total of 1.024 million complex time samples, representing exactly 1-second of observation time, are collected and stored in memory at Block 1850.

Figure 19:
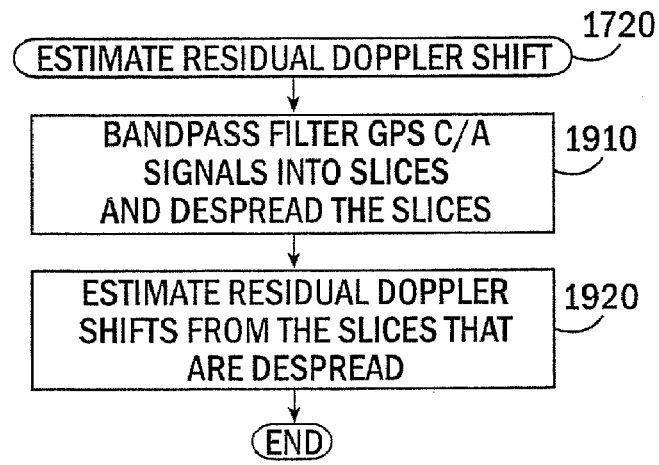
FIG. 19 is a flowchart of operations that may be performed to estimate residual Doppler shift in embodiments of FIG. 17.

FIG. 19 is a flowchart illustrating operations of Block 1720 of FIG. 17 according to some embodiments of the present invention. As shown in FIG. 19, in these embodiments, residual Doppler shift estimation includes two operations. At Block 1910, bandpass filtering of the received input samples x(n) into narrow frequency bands called "slices" is performed, and then the filtered, frequency-sliced samples are despread using an internally generated reference code matched to the received C/A code. Then, at Block 1920, the residual Doppler shifts are estimated from the slices that are despread.

Figure 20:
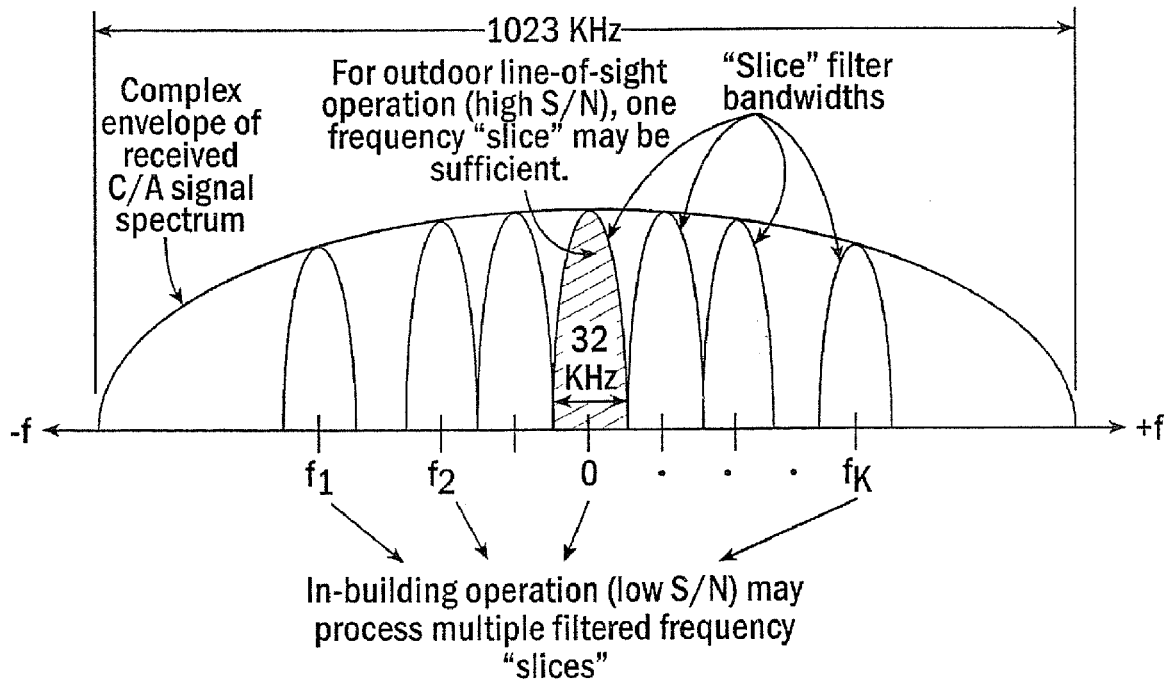
FIG. 20 is a frequency spectrum representation of filtering of received samples into frequency slices according to embodiments of the present invention.

FIG. 20 illustrates bandpass filtering GPS C/A signals into frequency slices, as was generally described in Block 1910 of FIG. 19. More particularly, the one second snapshot x(n) of received signal plus noise samples from Block 1710 is first filtered by a bank of K bandpass filters, as illustrated in FIG. 20. In some embodiments, each filter has a bandwidth of, for example, approximately 32 kHz. Each filter passes a frequency band or "slice" of the received signal plus noise. The total number of slices K to be processed may depend on the signal-to-noise ratio of the input samples. For example, for an outdoor case with direct line of sight to the SVs, simulation results indicate that a single frequency slice centered at 0 Hz (in the complex baseband) may be sufficient. For the indoor case where significant attenuation of the SV signals may exist, up to, for example, seven frequency slices (K=7) may be used to obtain an accurate estimate of the Doppler frequency. The filtering of input sequence x(n) into frequency slices may be performed once for all C/A signals to be processed.

Figure 21:
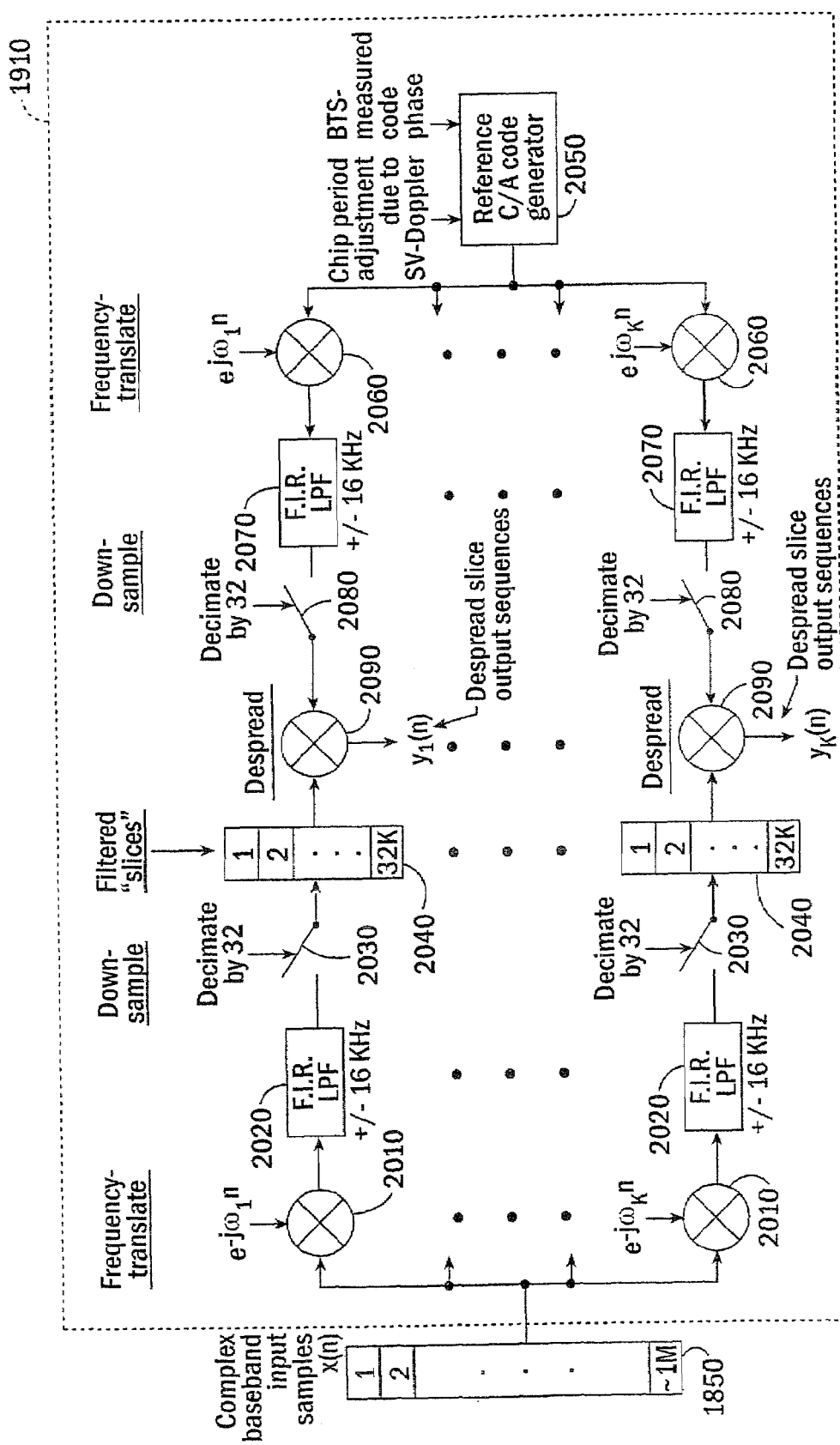
FIG. 21 is a block diagram illustrating additional detailed embodiments of FIG. 19.

FIG. 21 is a block diagram of operations that may be performed in filtering and despreading the input samples (Block 1910 of FIG. 19). These operations may be performed in parallel for each frequency slice. At Blocks 2010, the 1.024 million complex received samples x(n) from Block 1850 are first frequency-translated by multiplication with complex sinusoid $e^{-j\omega_k n}$, ($1 \leq k \leq K$), where $\omega_k$ is the center frequency of the "$k^{th}$" frequency slice. Fourier Transform theory states that multiplication of a signal by $e^{-j\omega_k n}$ in the time domain is equivalent to translating its spectral components by an amount $\omega_k$ in the frequency domain. The frequency translated sequences are passed through digital low-pass filters 2020 having a filter bandwidth of, for example, ±16 kHz. A choice of filter bandwidth is explained below. This filtering passes that part of the frequency content of the original x(n) samples contained within a ±16 kHz frequency slice centered at frequency $\omega_k$. The filtered output is then down-sampled at Blocks 2030 using decimation-by-32, resulting in a sequence 2040 containing, for example, 32000 complex elements for each frequency slice. Down-sampling can greatly reduce the computations for the downstream processes, in some embodiments of the invention.

Still continuing with the description of FIG. 21, for each C/A signal, the receiver generates an internal reference code sequence 2050 set to the same Gold code used by the received C/A signal. The reference code phase is synchronized to the code phase of the C/A signal as measured at the local BTS. A very small timing adjustment (a few parts per million or less), due to the SV-induced Doppler shift, may be applied to the reference Gold Code sample period at Block 2050 to maintain alignment with the received C/A code over the entire 1-second observation period.

For each slice, the internal reference code sequence 2050 is frequency-translated by multiplication at Blocks 2060, with complex sinusoid $e^{+j\omega_k n}$. Note that the exponent $+j\omega_k n$ has the opposite sign from the translation $e^{-j\omega_k n}$ (Block 2010) applied to the input samples. This may be used so that the translation sinusoids $e^{-j\omega_k n}$ and $e^{+j\omega_k n}$ cancel each other when multiplied together later at Blocks 2090. The frequency-translated reference code samples are next low-pass filtered at Blocks 2070 and down-sampled at Block 2080 using, for example, decimation by 32. This produces a frequency "slice" of the reference code corresponding to that of the input samples, but in the opposite frequency direction. Finally, the filtered received sequence 2040 for each frequency slice is despread by multiplication at Block 2090 with its corresponding filtered reference code to produce a despread output sequence $y_k(n)$ ($1 \leq k \leq K$) containing, for example, 32000 complex elements, as shown in FIG. 21.

It can be shown mathematically that the despread slice output sequence $y_k(n)$ in FIG. 21 is given by:

$$y_k(n) = Cd(n)e^{j[\omega_D n + \theta + \Delta\theta_k]}(+\text{higher frequency terms}),$$
$$[1 \leq k \leq K]$$

where:
- d(n)=50 bps data modulation overlay (±1),
- $\omega_D$=received signal Doppler frequency,
- C=a constant,
- θ=a constant phase angle, and
- $\Delta\theta_k$=a variable phase angle component, proportional to the product of the slice center frequency $\omega_k$ and the time offset between the received C/A code and internal reference code phases.

The "higher frequency terms" in Equation (3) are filtered out in subsequent processing, and therefore may not be relevant to the solution.

Accordingly, FIG. 21 illustrates embodiments of the present invention where the processor of the mobile terminal is configured to bandpass filter the GPS C/A signals into frequency slices by frequency translating the GPS C/A signals, low pass filtering the GPS C/A signals that are frequency translated and downsampling the low pass filtered, frequency translated GPS C/A signals. FIG. 21 also illustrates embodiments of the present invention wherein the processor of the mobile terminal is further configured to despread the frequency slices by generating an internal reference code sequence, frequency translating the internal reference code sequence for each frequency slice, low pass filtering the frequency translated reference code sequences, and multiplying by the downsampled low pass filtered, frequency translated GPS C/A signals.

A detailed description of the use of filtering prior to despreading, as was generally described in FIG. 21, now will be provided. Specifically, the internally generated reference code 2050 in FIG. 21 is synchronized to the received C/A code in order to despread the received signal 1850. However, the precise code phase of the received C/A signal is still unknown at this point, and may be several chips offset from the internal reference code phase (which is synchronized to the code phase measured at the BTS). As explained below, both the input x(n) and reference code may be filtered into narrow frequency "slices" to allow sufficient correlation between the two to enable despreading to occur.

Figure 22:
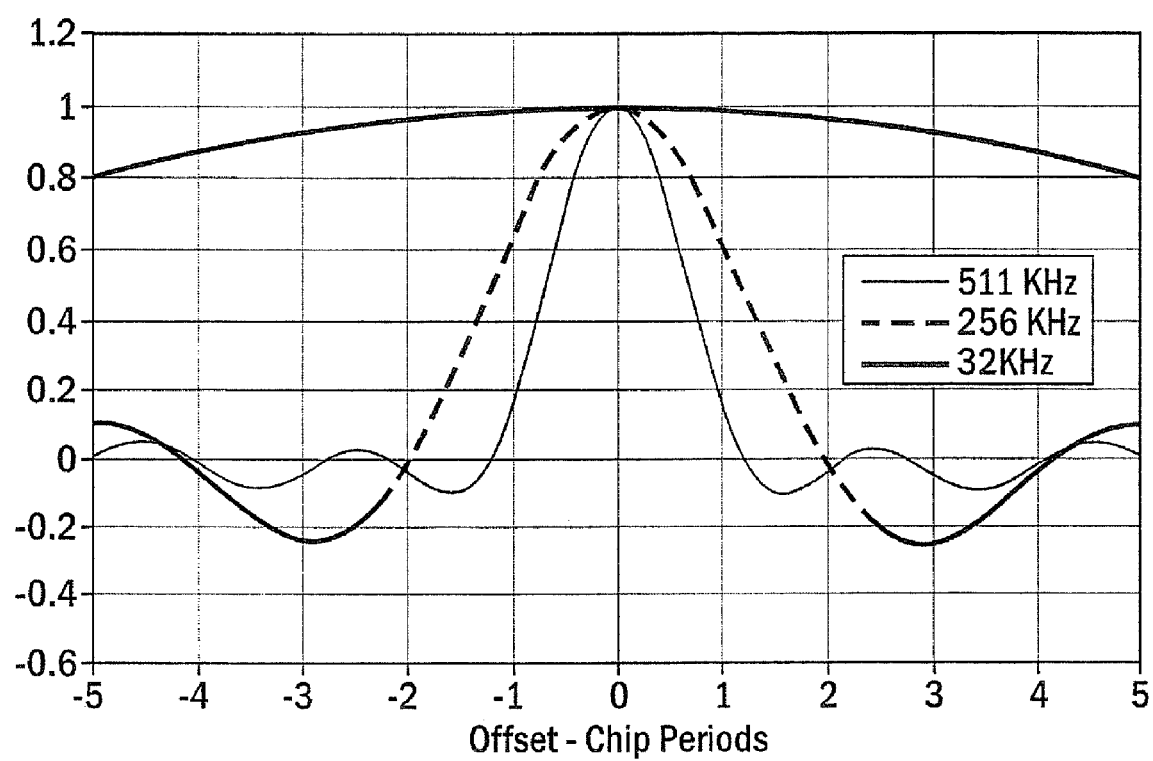
FIG. 22 graphically illustrates low pass filter gold code autocorrelation peaks vs. offset chip periods according to some embodiments of the present invention.

The effect of the filtering is shown in FIG. 22. In this figure, the autocorrelation of a 1023-chip Gold sequence with chip rate of 1.023 Mcps is plotted for several values of low-pass filtering. For a filter bandwidth of 511 kHz, the autocorrelation peak falls off to near-zero at an offset of one chip position, indicating that two identical Gold sequences would be almost completely decorrelated with just one chip offset between them. When the filter bandwidth is reduced to 256 kHz, decorrelation occurs at an offset of about 2 chip periods. When the filter bandwidth is further reduced to 32 kHz, the auto-correlation peak becomes very broad, remaining relatively flat over an offset range of ±5 chip periods.

Recall that the reference code phase is set equal to the C/A code phase measured at the BTS. It was previously shown that the code phase measured at any location within a cell of 1 km radius may lie within about ±4 chip periods of the code phase measured at the BTS. Therefore, FIG. 22 shows that the C/A code received at the mobile terminal, when filtered to a ±32 kHz bandwidth or narrower, can maintain a high degree of correlation to the reference code (also filtered to the same bandwidth) for code phases that can be received within the coverage area of the cell.

A potential benefit of this filtering technique is that it can provide sufficient correlation between the received and reference codes to perform despreading, without having to do an exhaustive search to precisely align the two sequences. This can significantly reduce the computational load for operations of FIG. 21.

Figure 23:
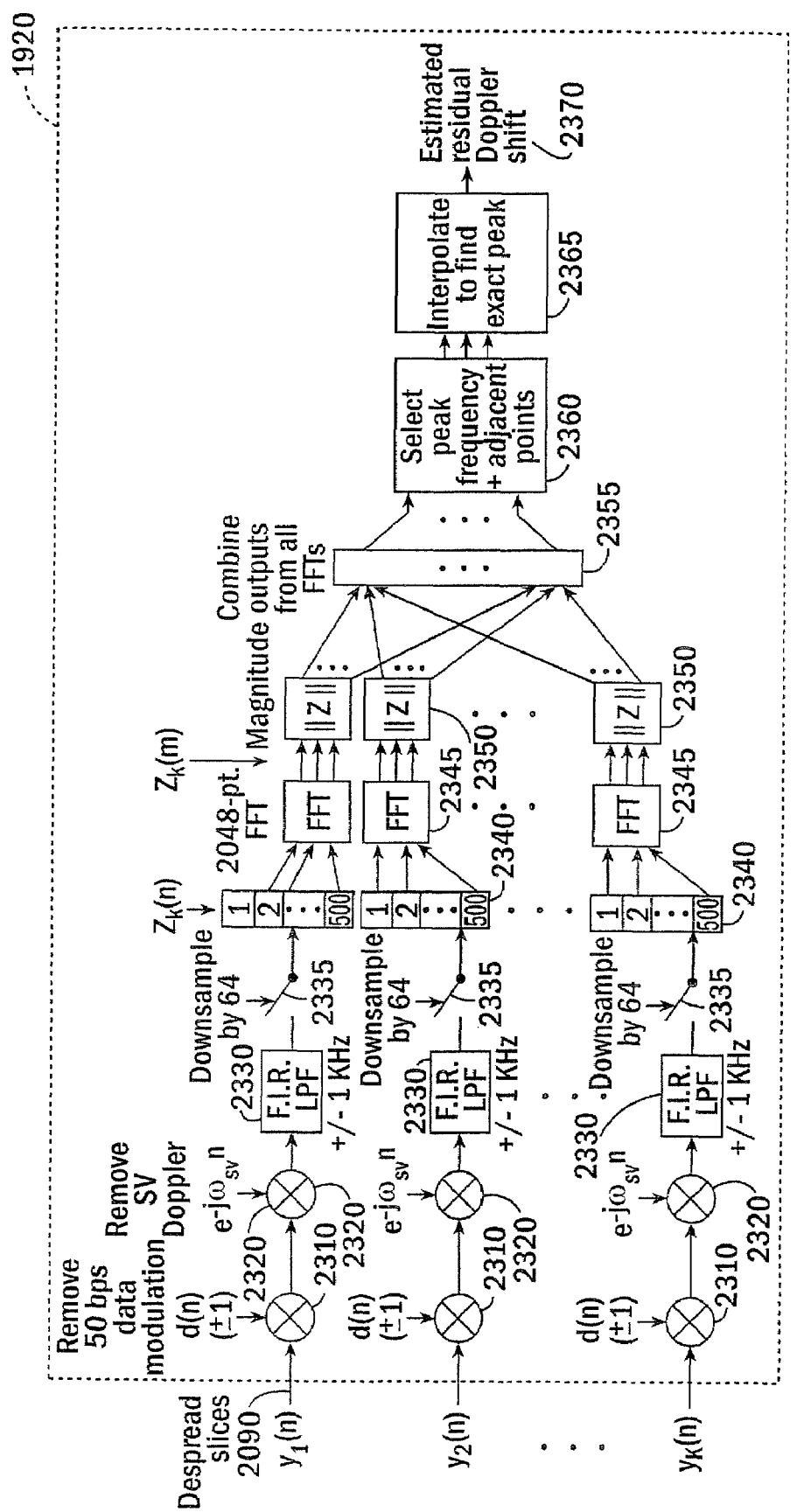
FIG. 23 is a block diagram illustrating additional detailed embodiments of FIG. 19.

FIG. 23 is a block diagram of operations that may be performed to estimate residual Doppler shifts from the slices that are despread, which may correspond to Block 1920 of FIG. 19. These operations may be repeated for each received C/A signal. Referring now to FIG. 23, the despread $y_k(n)$ 2090 are first multiplied by the 50 bps ephemeris data at Blocks 2310 to strip off the 50 bps modulation. The 50 bps data bit sequence may be supplied by the BTS to the mobile terminal. The samples are then multiplied at Blocks 2320 by the complex sinusoid $e^{-j\omega_{SV}n}$, where $\omega_{SV}$ is the received Doppler frequency component due to SV motion measured at the BTS. The multiplication at Block 2320 removes the SV-induced Doppler shift by frequency-translating $y_k(n)$ by the negative of the SV Doppler frequency component. After this frequency translation, only the residual Doppler shift due to user motion may remain.

Still referring to FIG. 23, the samples are next low-pass filtered at Blocks 2330 to a bandwidth of, for example, ±1 kHz to remove the higher frequency terms in Equation (3), and down-sampled at Blocks 2335 by a factor of, for example, 64. The resulting sequences $z_k(n)$ Blocks 2340 contain, for example, 500 samples for each frequency slice. The $z_k(n)$ are "zero-padded", for example, to 2048 samples, and then Fast Fourier Transformed (FFT) at Blocks 2345 to the frequency domain. The resulting complex frequency elements $Z_k(m)$ are converted to magnitude (or, in some embodiments, magnitude-squared) values at Blocks 2350, and then added together across all K-frequency slices on a point-by-point basis at Block 2355.

The frequency peaks corresponding to the residual Doppler frequency add coherently at Block 2355 since they occur at the same place for all slices. However, random peaks caused by channel noise add non-coherently because the noise contained within the slices are uncorrelated (since the slices are assumed to not substantially overlap in frequency). Thus, the summation process across multiple frequency slices at Block 2355 can enhance the ratio of true Doppler peak to the false peaks caused by the channel noise. The frequency peak and several adjacent points on either side are selected at Block 2360, and then interpolated at Block 2365 using, for example, a parabolic best-fit to estimate the exact value of the residual Doppler shift $\omega_{MT}$ due to user motion 2370. This value 2370, when added to the SV-Doppler component $\omega_{SV}$ downloaded to the mobile terminal from the BTS, provides an estimate of total Doppler shift $\omega_D$ for the received C/A signal, which can be accurate to within a fraction of a Hertz.

Accordingly, FIG. 23 illustrates embodiments of the present invention wherein the processor is configured to estimate the Doppler shifts from the frequency slices that are despread by frequency-translating the frequency slices that are despread by the Doppler shift frequency that is measured at the wireless network to obtain the residual Doppler shift due to mobile terminal motion, transforming the despread frequency-translated slices to the frequency domain (for example by fast-Fourier transform), converting complex frequency domain values to magnitude (and/or magnitude-squared) values, and adding the magnitude values on a point-by-point basis across the frequency slices.

Figure 24:
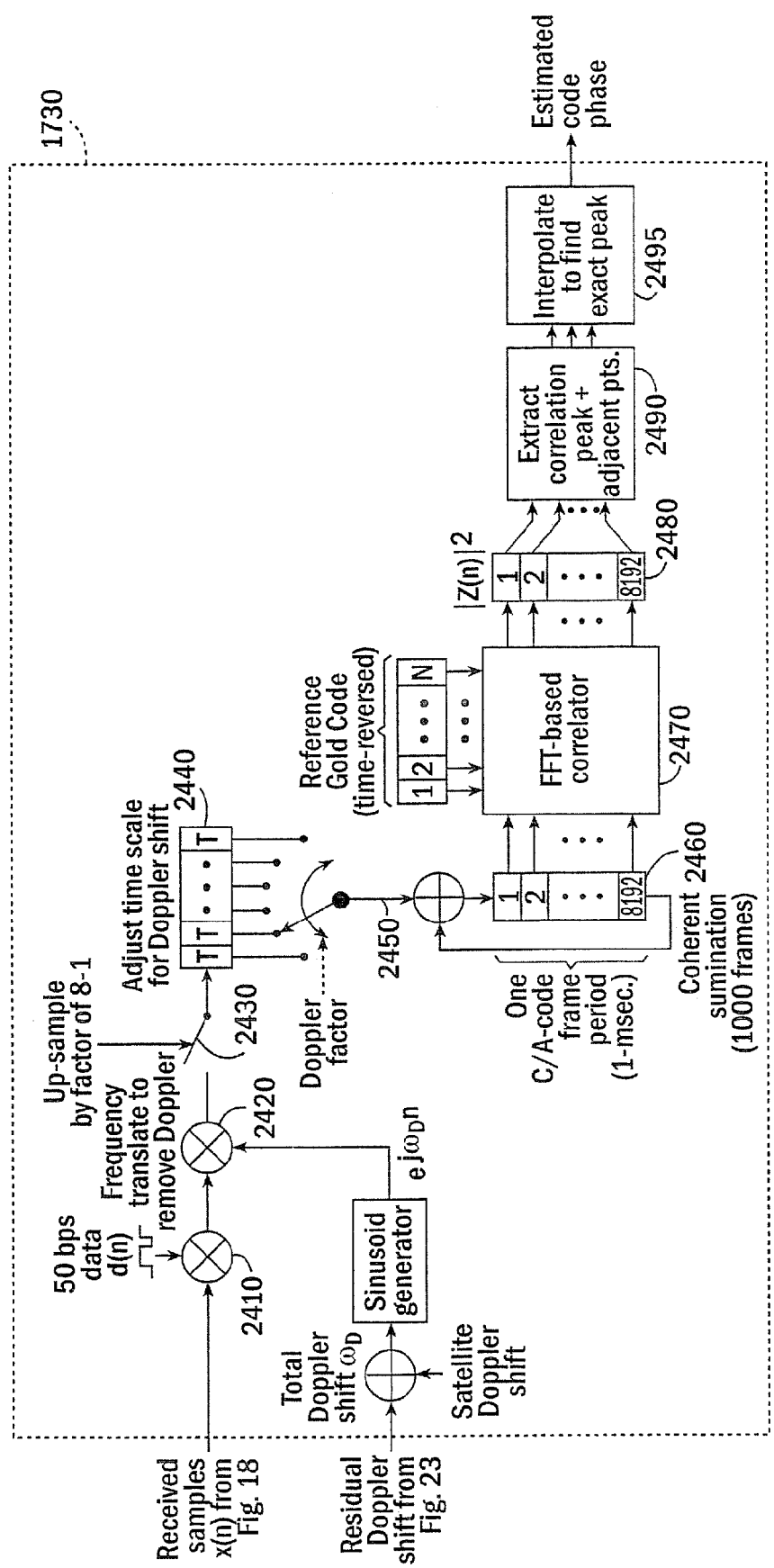
FIG. 24 is a block diagram illustrating still other detailed embodiments of FIG. 17.

FIG. 24 is a block diagram of operations that may be performed to estimate the received code phase, which may correspond to Block 1730 of FIG. 17. Referring to FIG. 24, the received samples x(n) from FIG. 18 are first multiplied at Block 2410 by the 50 bps ephemeris data sequence to strip off the data modulation.

The total Doppler shift is then removed by multiplying the received samples by the complex sinusoid $e^{j\omega_D n}$ at Block 2420, where the frequency $\omega_D$ is the total Doppler shift comprised of the residual Doppler estimated in FIG. 23, plus the SV-Doppler component downloaded from the BTS. A very small effect of the Doppler shift on the received chip duration may also be compensated by first up-sampling the sequence by a factor of, for example, 8 at 2430, and then adjusting the time scale of the samples periodically in 1/8-chip steps by incrementing or decrementing the tap delay output of the shift register 2440. The resulting true baseband samples 2450 (having all Doppler shift removed in some embodiments) contain two components: a signal term comprised of identical repeating Gold Code frames at a frame period of 1-msec., and a noise component. Successive 1-msec. segments are then summed at Block 2460 point-by-point to produce a single frame of, for example, 8192 sample points, thereby compressing, for example, the entire 1-second snapshot into a single equivalent 1-msec. frame. The signal components from each of the 1000 original segments 2450 combine coherently, while the uncorrelated noise components combine non-coherently. This can produce a factor of 1000 (30 dB) improvement in the signal-to-noise ratio of the equivalent frame 2460.

Figure 25:
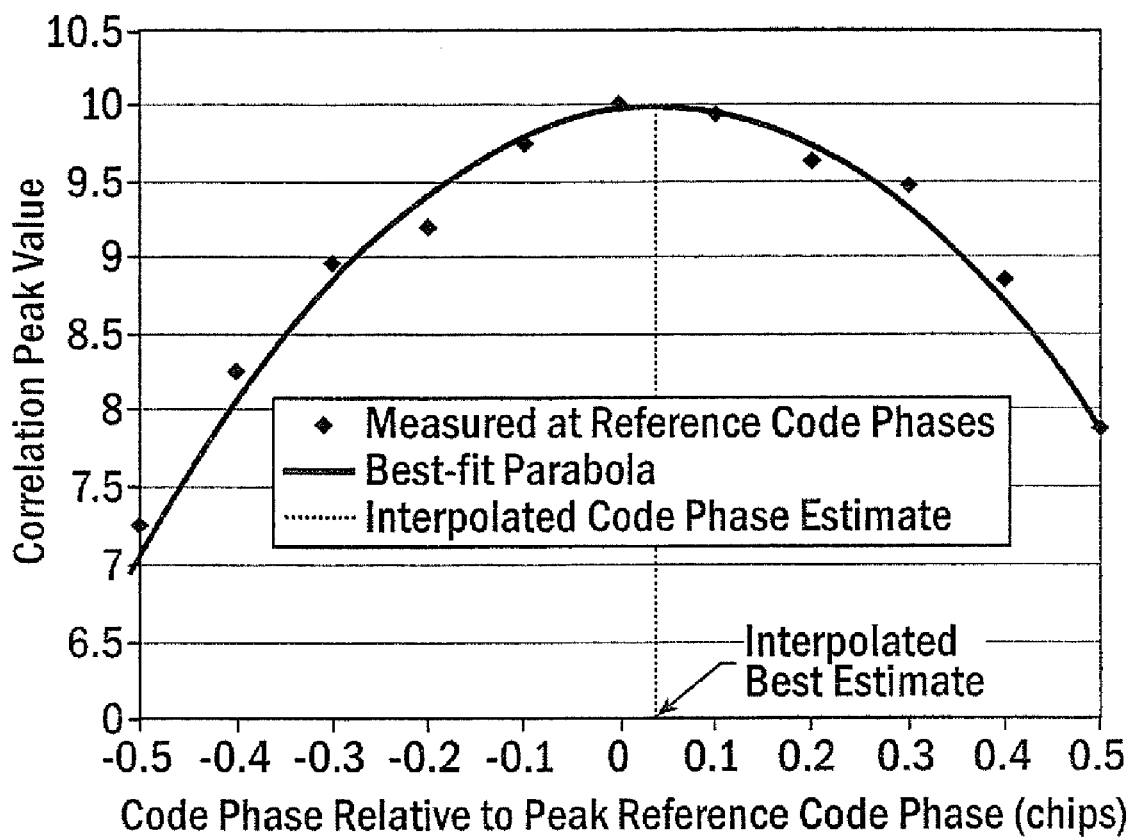
FIG. 25 graphically illustrates interpolation for estimating code phase according to some embodiments of the present invention.

Still referring to FIG. 24, the 1-msec. frame 2460 is then correlated with an internally generated reference code frame identical the received C/A Gold Code at Block 2470. The correlation at Block 2470 can be based on a Fast Fourier Transform (FFT) in some embodiments. This FFT can use the correspondence between multiplication in the frequency domain and convolution in the time domain to produce a very computationally efficient correlation in some embodiments. The complex output values from the correlation Block 2470 are converted to magnitude-squared values at 2480, and the location of the peak value corresponds to the code phase of the received C/A signal. The peak value 2490 together with several adjacent points on either side are interpolated at 2495, for example by generating a least-squares-fit to a parabolic curve in the same manner as was done to interpolate the Doppler frequency at Block 2365. The code phase value corresponding to the vertex of the parabola is chosen as the final interpolated code phase estimate for the received C/A signal. FIG. 25 graphically illustrates an embodiment of this interpolation.

Accordingly, FIG. 24 illustrates embodiments of the present invention wherein the processor of the mobile terminal is configured to estimate the code phases of the GPS C/A signals by removing a total Doppler shift by frequency-translating the GPS C/A signals by the sum of the residual Doppler shifts that are estimated plus the Doppler shift that is measured at the wireless network, summing segments of the GPS C/A signals from which the total Doppler shift has been removed, correlating the summed segments with an internally generated code frame, and determining the time offset corresponding to the peak magnitude squared value.

Operations of FIGS. 21, 23, and 24 may be repeated for each C/A signal as was shown in FIG. 17, and the resulting estimates of code phase and residual Doppler shift for each SV determined from FIGS. 23 and 24, respectively, are transmitted from the mobile terminal to the NOC (Block 1740). At the NOC, they are combined with SV ephemeris and cell location information to generate a final position fix. The processing performed at the NOC may be similar to that used in conventional assisted-GPS methods, such as described in U.S. Pat. Nos. 5,663,734 and/or 6,169,514, and need not be described further herein. The final position fix may then be downloaded to the mobile terminal from the NOC and displayed to the mobile user.

In some embodiments of the invention, the complex frequency translation sinusoids $e^{j\omega_X n}$ shown in FIGS. 21, 23, and 24, where $\omega_X$ generically represents the specific translation frequencies given in the Figures, may in some cases be replaced by complex sinusoidal approximations such as a square wave or other suitable periodic complex waveforms having frequency $\omega_X$.

In some embodiments of the invention, the combination of removing the total Doppler shift (determined in FIG. 23) and stripping off the 50 bps data modulation from the received input samples can enable the entire 1-second snapshot collected in FIG. 18 to be compressed down to an equivalent single 1-msec. code frame of 8192 points (Block 2460). This can greatly reduce the number of computations to implement the FFT-based correlation (Block 2470) in FIG. 24 to determine the code-phase of the received C/A signals, according to some embodiments of the invention.

Other embodiments for determining the code phase of the received C/A signals now will be described. These embodiments can replace and/or be used with the embodiments described in FIG. 24.

In particular, referring to the Doppler estimation in FIG. 21, it was shown in Equation (3) that the despread outputs $y_k(n)$ for each of the K frequency slices contain a variable phase angle $\Delta\theta_k$ associated with the Doppler frequency term. It can be shown analytically that $\Delta\theta_k$ is related, to a very close approximation, to the difference between the received C/A signal code phase and the internal reference code phase as follows:

$$\Delta\theta_k = -\omega_k \Delta\tau \quad (4)$$

where:
$\omega_k$=center frequency of "$k^{th}$" slice (radians/sec.), and
$\Delta\tau$=received C/A signal code phase minus internal reference code phase (sec.).

Denote $\Delta\tau$ as the "residual code phase", because it represents the time difference between the code phase measured at the mobile terminal and the code phase measured at the local BTS (to which the mobile terminal's internal reference code is synchronized).

Equation (3) shows that the Doppler frequency term in $y_k(n)$ also contains a constant phase angle $\theta$ that is the same for all frequency slices. Let $\theta tot_k$ be the total phase angle of the Doppler frequency term in $y_k(n)$. Then from Equations (3) and (4):

$$\theta tot_k = \theta + \Delta\theta_k = \theta - \omega_k \Delta\tau. \quad (5)$$

The difference in total phase angle between the $k^{th}$ and $j^{th}$ frequency slices is given by:

$$\theta tot_k - \theta tot_j = \omega_j \Delta\tau - \omega_k \Delta\tau = (\omega_j - \omega_k)\Delta\tau. \quad (6)$$

Equation (6) can be solved explicitly for the residual code phase $\Delta T$ as follows:

$$\Delta\tau = -(\theta tot_k - \theta tot_j)/(\omega_k - \omega_j) \quad (7)$$

From Equation (7), it can be seen that if $\theta tot_k$ is plotted versus slice center frequency $\omega_k$ for all K frequency slices, the resulting points will align in a straight line whose slope is equal to the negative of the residual code phase $\Delta\tau$. In this way, $\Delta\tau$ can be determined as an extension of the Doppler shift estimation in FIG. 23 with very little additional computational effort, in some embodiments of the invention. These embodiments can represent a significant reduction in computations compared to the code phase estimation process described in FIG. 24.

Figure 26:
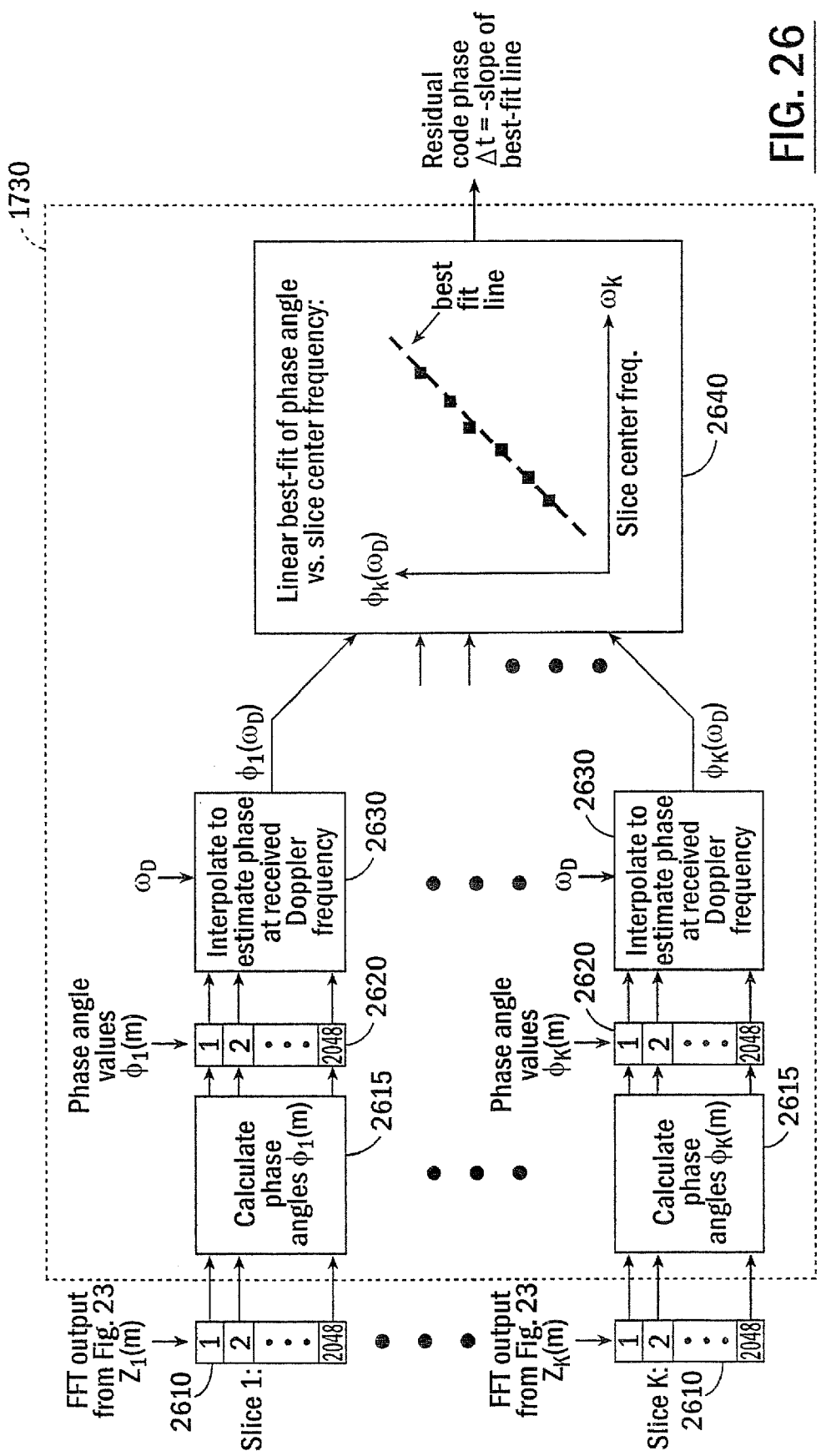
FIG. 26 is a block diagram illustrating yet other detailed embodiments of FIG. 17.

FIG. 26 is a block diagram of these alternate embodiments to estimate the received code phase, which may also correspond to Block 1730 of FIG. 17. Referring to FIG. 26, the phase $\phi_k(m)$ of the complex FFT output elements $Z_k(m)$ 2610 from FIG. 23 are calculated at Blocks 2615 using the relation:

$$\phi_k(m) = \text{Arctan}[\text{Im}\{Z_k(m)\}/\text{Re}\{Z_k(m)\}], \quad (8)$$

where $\text{Im}\{Z_k(m)\}$ and $\text{Re}\{Z_k(m)\}$ are imaginary and real parts of $Z_k(m)$, respectively. The resulting phase values $\phi_k(m)$ 2620 are interpolated at Blocks 2630 to determine the phase angle $\phi_k(\omega_D)$ corresponding to the precise Doppler shift frequency $\omega_D$ determined in FIGS. 23 and 24. The $\omega_k(\omega_D)$ values as a function of slice center frequency $\omega_k$ are least-squares fit to a straight line at Block 2640. Since the range of $\phi_k(\omega_D)$ values may vary by more than $2\pi$ radians, this operation may involve "unwrapping" the $\phi_k(\omega_D)$ terms by adding or subtracting multiples of 2π so that the results fall in an unbroken straight line over all slice frequencies $\omega_k$. The residual code phase Δτ is then determined as the negative slope of the linear best-fit to the $\phi_k(\omega_D)$ vs. $\omega_k$ data points. Finally, the total code phase estimate for the given C/A signal is equal to the residual code phase Δτ plus the internal reference code phase (i.e., the code phase measured at the local BTS).

Accordingly, FIG. 26 illustrates other embodiments of the present invention, wherein the processor of the mobile terminal is configured to estimate the code phases of the GPS C/A signals by calculating phases of the frequency slice values that have been converted to the frequency domain, determining phase angles corresponding to the estimated Doppler shift frequency for each of the slices, and determining a residual code phase from the phase angles.

Embodiments of the invention that were described above assume that the received C/A signal code phase at the mobile terminal is within a relatively small number of chips offset from the code phase measured at the local BTS. This may constrain the maximum distance between the mobile and BTS to the order of a few miles. This potential constraint may not pose a problem in a terrestrial cellular network (conventional and/or ATC-based) where the cell radius may typically be on the order of or less than one mile. However, in a satellite network, a satellite beam coverage may extend over hundreds of miles, which may far exceed the assumed maximum distance. Consequently, it may be desirable for the satellite network to be able to estimate the location of the mobile terminal to within, for example, a few miles uncertainty inside its beam, and then transmit to the mobile the pertinent C/A code phase and Doppler information referenced to the mobile's estimated location. Using this information, the mobile terminal can then proceed to measure the precise C/A code phase and Doppler shift as described above. Two embodiments for determining the mobile terminal's approximate location within a satellite beam will now be described.

In general, in first embodiments, the mobile terminal's approximate location within a satellite beam is determined by measuring relative differences in received signal levels between adjacent satellite beams at the mobile terminal. In second embodiments, the mobile terminal's approximate location within a satellite beam is determined by measuring path delays between the mobile terminal and a satellite gateway via at least two satellites.

More specifically, the first embodiments compare signal levels from adjacent beams and may be suitable when satellite coverage includes multiple spot beams with coverage overlap between adjacent beams. In these embodiments, the signal levels received in the mobile terminal's assigned spot beam as well as the immediately adjacent beams are compared, and an estimate of the mobile terminal's location is determined by analyzing the relative differences in received signal levels between the beams.

Figure 27:
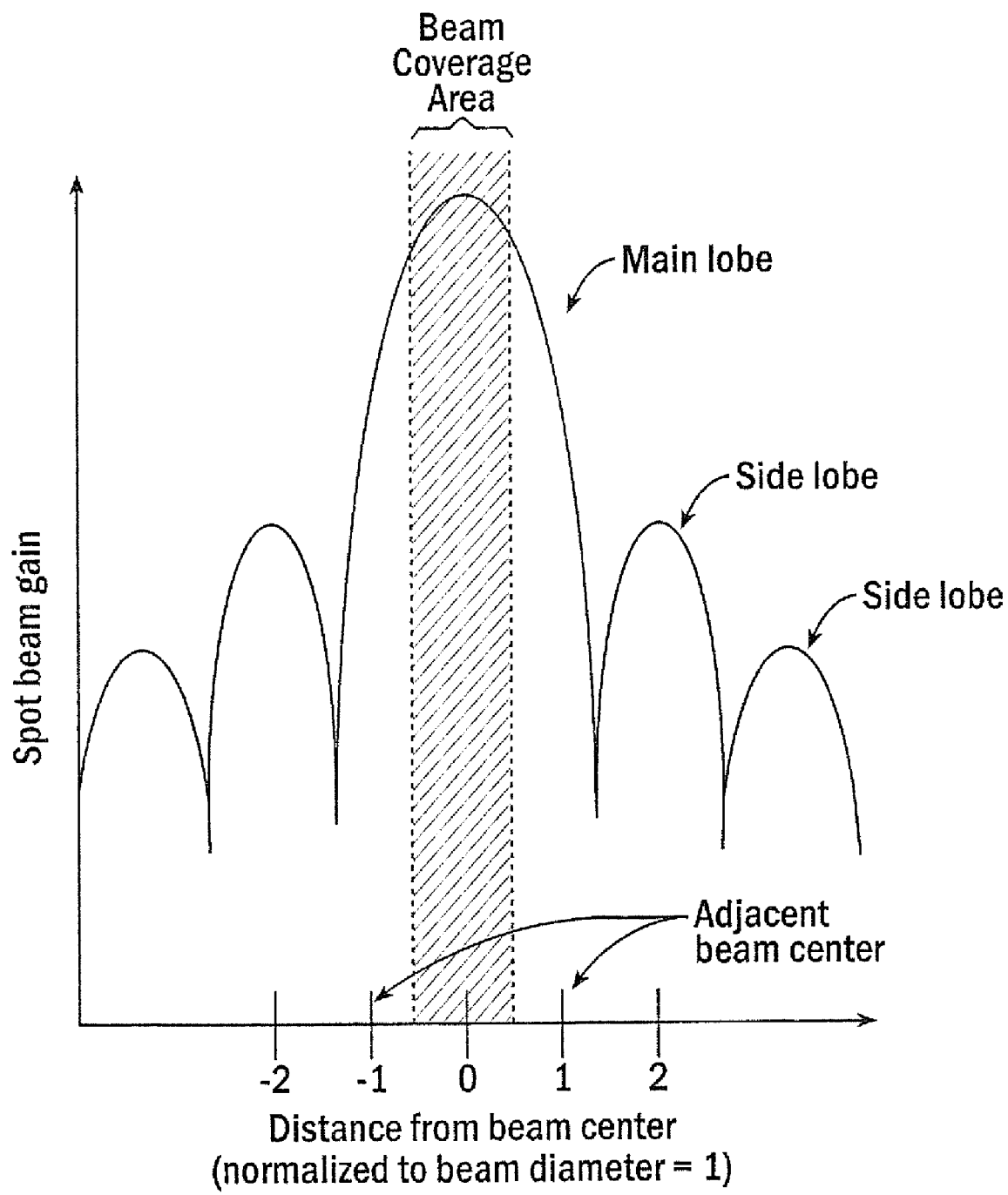
FIG. 27 graphically illustrates a spot beam gain pattern as a function of distance from beam center.

FIG. 27 graphically illustrates an example of a typical spot beam antenna pattern. The pattern generally is short-term invariant and is assumed to be known to the satellite network.

Figure 28:
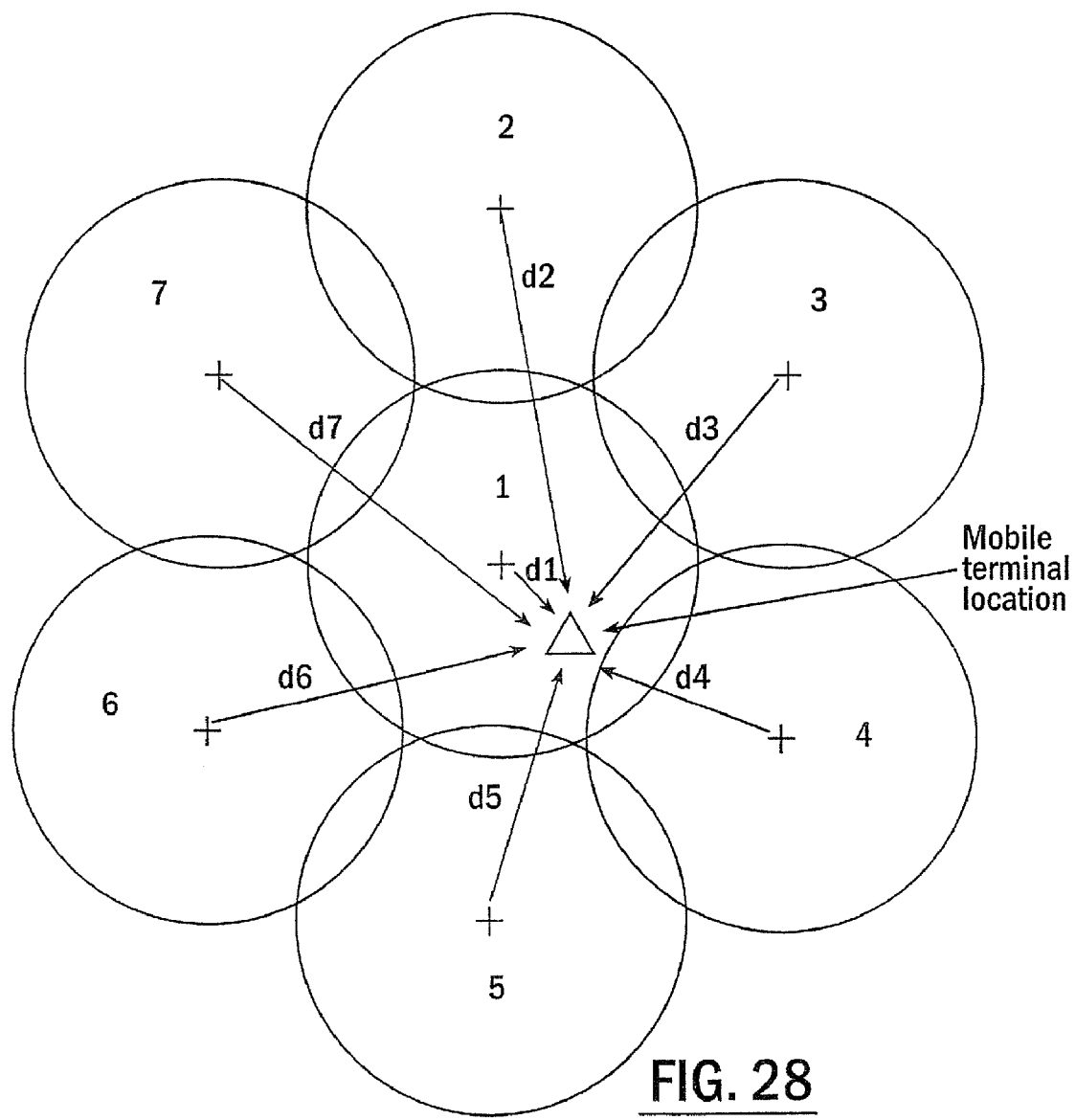
FIG. 28 graphically illustrates an example of determining a mobile terminal location within spot beam coverage according to some embodiments of the present invention.

Consider a mobile terminal located within the spot beam coverage map of FIG. 28. The mobile terminal transmits a signal to the satellite, which is simultaneously received at the satellite gateway over the mobile terminal's assigned beam and, for example, six adjacent beams. The received signal levels vary between the beams, due to the different spot beam gains that occur at distances d1 through d7 from the mobile terminal to each beam center. The NOC measures these signal levels and makes an initial guess as to the radial distance d1 from the mobile terminal to the center of its assigned beam. Then, the spot beam gain corresponding to radial distance d1 is calculated using the known spot beam pattern data, such as that shown in FIG. 27. The differences in measured signal levels between the mobile terminal's assigned beam and adjacent beams are then used to produce spot beam gain estimates for beams 2 through 7, which in turn produce estimates of radial distances d2 through d7 for the adjacent beams.

Figure 29:
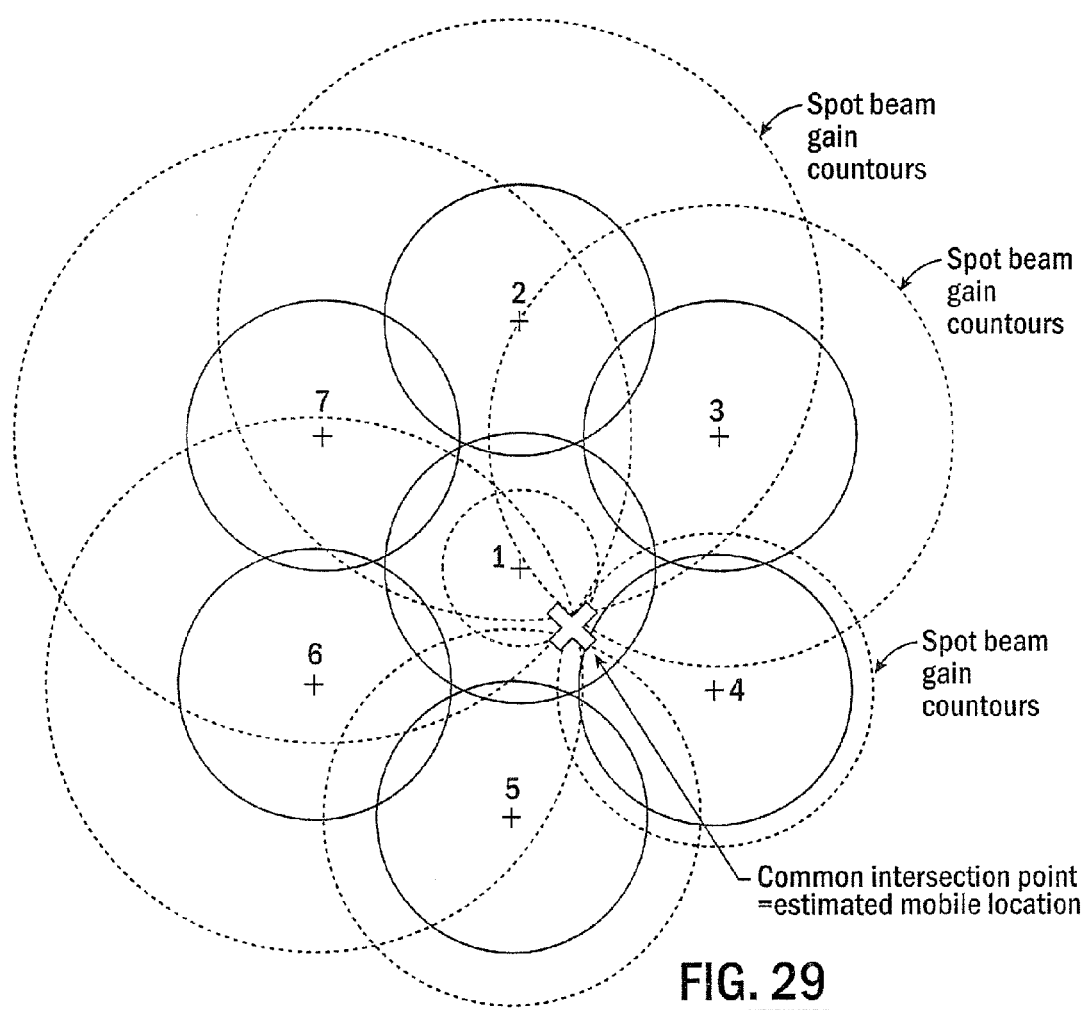
FIG. 29 illustrates an example of an estimate of mobile terminal location using gain contours according to some embodiments of the present invention.

As shown in FIG. 29, circles of radius d1 through d7 centered on their respective spot beams are projected onto the coverage map. These circles represent contour lines of the spot beam gains that were estimated from the signal measurements. If the contour circles do not intersect at least one common point, a new radial distance d1 is chosen and the above operations may be repeated iteratively. When all the contour circles intersect, the area of intersection represents the mobile terminal's estimated location. This case is illustrated in FIG. 29.

As an alternate embodiment to the above, the mobile terminal may measure multiple signals received from the satellite gateway over each of the beams in FIG. 28. For example, a satellite network typically broadcasts a common control channel in each beam. The mobile terminal can make near-simultaneous measurements of the received control channel level in each beam, and transmit this information over the satellite link to the NOC. The NOC then can use the same operations described above to estimate the mobile terminal's location by finding an intersection region of the estimated spot beam gain contour circles as illustrated in FIG. 29.

As noted above, second embodiments can use multi-satellite diversity. These embodiments may be more suitable when two or more satellites are used to provide transmission path diversity for the network. The path distances between the satellites and the gateway station may be assumed to be known precisely by the network. The satellite gateway broadcasts a periodic time mark to all mobile terminals in the network over one of the satellites. The mobile terminal receives the time mark, and after a fixed wait time known to the network, transmits a response signal back to the gateway. The response signal is simultaneously received at the gateway over the plurality of diversity satellites. The total elapsed time from transmission of the time mark to reception of the mobile terminal response signal over each of the satellite paths is measured. The fixed wait time at the mobile terminal, as well as the satellite's internal transmission delay and any other fixed delays are subtracted out. The remaining times represent the round-trip path delays from gateway to mobile terminal and back to gateway for each satellite.

By knowing the speed of light and the precise distances from the gateway station to the satellites, the path distance "Pn" between satellite "n" and the mobile terminal can be estimated for each satellite. The set of equidistant points at a distance "Pn" from satellite "n" forms a spherical surface of radius Pn centered at satellite "n". The intersection of this spherical surface with the surface of the earth forms an arc on the earth's surface. The mobile terminal is constrained to lay somewhere on or very close (accounting for altitude uncertainties) to this arc. The arcs produced by the plurality of satellites are offset from each other due to their different satellite orbital locations, and therefore intersect each other at a finite number of points.

Figure 30:
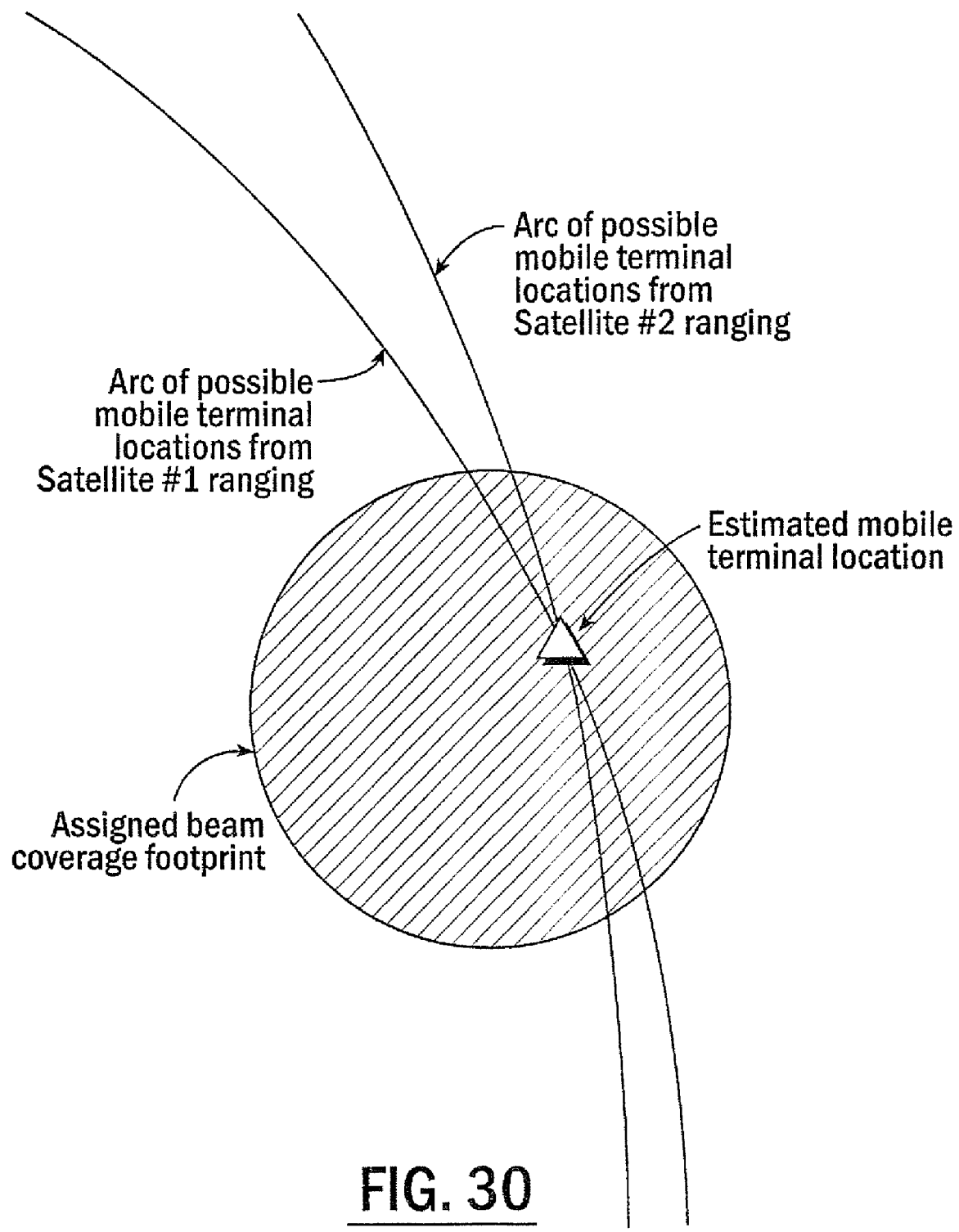
FIG. 30 illustrates an example of geo-location using ranging from two diversity satellites according to some embodiments of the present invention

FIG. 30 illustrates the ranging position arcs produced by two diversity satellites, superimposed on the coverage area of the mobile terminal's assigned beam. The intersection of the two arcs is chosen as the estimate of the mobile terminal's location.

After the mobile terminal's location within its satellite beam has been estimated using one of the two embodiments described above and/or other embodiments, the SV code phase, Doppler shift, and 50 bps ephemeris data sequence that would be observed from that location are transmitted to the mobile terminal. However, unlike the terrestrial cellular network, there may be no local BTS to measure these parameters directly. Instead, the satellite network may have complete knowledge of the positions, velocities, and directions of all SVs in view at the time of the mobile's measurement, as well as their code phases and 50 bps data sequences. With this information, the NOC can calculate the code phase, Doppler shift, and 50 bps data bit transition times projected to any given observation point on the earth, replacing the direct measurement performed by the terrestrial BTS. The mobile terminal uses this information supplied by the satellite network to perform its SV code phase and Doppler shift measurements, as was previously described for the terrestrial case.

As will be appreciated by one of skill in the art, the present invention may be embodied as a method and/or an apparatus. The present invention may take the form of an entirely hardware embodiment, an entirely software embodiment or an embodiment combining software and hardware aspects. Furthermore, the present invention may be embodied as a computer program product on a digital storage medium having computer-readable instructions embodied in the medium. Any suitable digital storage medium may be utilized, including a memory device, hard disk, CD-ROM, optical storage device, transmission medium, such as a wireless transmission medium and/or those supporting the Internet or an intranet, and/or a magnetic storage device.

The present invention was described with reference to block diagrams and/or flowchart illustrations of methods, apparatus (systems), mobile terminals, and/or computer program products according to embodiments of the invention. It is understood that a block of the block diagrams and/or flowchart illustrations, and combinations of blocks in the block diagrams and/or flowchart illustrations, can be implemented by computer program instructions. These computer program instructions may be provided to a processor of a general purpose computer, special purpose computer, a Digital Signal Processor (DSP) and/or other programmable data processing apparatus to produce a machine, such that the instructions, which execute via the processor of the computer and/or other programmable data processing apparatus, create means for implementing the functions/acts specified in the block diagrams and/or flowchart block or blocks.

These computer program instructions may also be stored in a computer-readable memory that can direct a computer, DSP, or other programmable data processing apparatus to function in a particular manner, such that the instructions stored in the computer-readable memory produce an article of manufacture including instructions which implement the function/act specified in the block diagrams and/or flowchart block or blocks.

The computer program instructions may also be loaded onto a computer, DSP, or other programmable data processing apparatus to cause a series of operational steps to be performed on the computer or other programmable apparatus to produce a computer-implemented process such that the instructions which execute on the computer or other programmable apparatus provide steps for implementing the functions/acts specified in the block diagrams and/or flowchart block or blocks.

It should also be noted that in some alternate implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A wireless communications system comprising:
   a satellite network that is configured to transmit wireless communications including Global Positioning System (GPS) data over a satellite frequency band that is outside a GPS frequency band; and
   a mobile terminal that is configured to receive the wireless communications including the GPS data from the satellite network over the satellite frequency band that is outside the GPS frequency band and to perform pseudo-range measurements using the GPS data that is received over the satellite frequency band that is outside the GPS frequency band.

2. A wireless communications system according to claim 1 further comprising a network operations center and wherein the mobile terminal is further configured to transmit the pseudo-range measurements to the network operations center.

3. A wireless communications system according to claim 2 wherein the network operations center is configured to receive the pseudo-range measurements and to determine a position of the mobile terminal using the pseudo-range measurements.

4. A wireless communications system according to claim 3 wherein the network operations center is further configured to transmit the position of the mobile terminal to the mobile terminal.

5. A wireless communications system according to claim 2 wherein the mobile terminal is configured to transmit the pseudo-range measurements to the network operations center via the satellite network.

6. A wireless communications system according to claim 2 further comprising a space-based component that is configured to wirelessly communicate with the mobile terminal over the satellite frequency band and wherein the mobile terminal is configured to transmit the pseudo-range measurements to the network operations center via the space-based component.

7. A wireless communications system according to claim 1 wherein the mobile terminal is further configured to receive GPS coarse/acquisition (C/A) signals from a plurality of GPS satellites, to estimate Doppler shifts in the GPS C/A signals and to estimate received code phases of the GPS C/A signals using the Doppler shifts that are estimated.

8. A wireless communications system according to claim 7 wherein the GPS data that is received from the satellite network includes a Doppler shift and a code phase and wherein the mobile terminal is further configured to estimate residual Doppler shifts in the GPS C/A signals due to mobile terminal motion using the Doppler shift and code phase and to estimate the code phases of the GPS C/A signals using the Doppler shift that is estimated.

9. A satellite network for a wireless communications system comprising:
   at least one satellite that is configured to transmit wireless communications including global Positioning System (GPS) data to mobile terminals over a satellite frequency band that is outside a GPS frequency band.

10. A satellite network according to claim 9 wherein the at least one satellite is further configured to receive pseudo-range measurements from mobile terminals over the satellite frequency band.

11. A satellite network according to claim 10 further comprising a network operations center and wherein the at least one satellite is further configured to transmit the pseudo-range measurements to the network operations center.

12. A satellite network according to claim 11 wherein the network operations center is configured to receive the pseudo-range measurements and to determine a position using the pseudo-range measurements.

13. A satellite network according to claim 12 wherein the network operations center is further configured to transmit the position of the mobile terminal to the mobile terminal.

14. A mobile terminal comprising:
a receiver that is configured to receive Global Positioning System (GPS) C/A signals from a plurality of GPS satellites; and
a processor that is configured to estimate Doppler shifts in the GPS C/A signals and to estimate received code phases of the GPS C/A signals using the Doppler shifts that are estimated.

15. A mobile terminal according to claim 14 wherein the receiver is further configured to receive from a wireless network a Doppler shift and a code phase and wherein the processor is further configured to estimate residual Doppler shifts in the GPS C/A signals due to mobile terminal motion using the Doppler shift and code phase and to estimate the received code phases of the GPS C/A signals using the Doppler shift that is estimated.

16. A mobile terminal according to claim 15 wherein the processor is configured to estimate the residual Doppler shifts in the GPS C/A signals due to mobile terminal motion by bandpass filtering the GPS C/A signals into frequency slices, despreading the frequency slices and estimating the Doppler shifts from the frequency slices that are despread.

17. A mobile terminal according to claim 16:
wherein the processor is configured to bandpass filter the GPS C/A signals into frequency slices by frequency translating the GPS C/A signals, low pass filtering the GPS C/A signals that are frequency translated and downsampling the low pass filtered, frequency translated GPS C/A signals; and
wherein the processor is configured to despread the frequency slices by generating an internal reference code sequence, frequency translating the internal reference code sequence for each frequency slice, low pass filtering the frequency translated reference code sequences and multiplying by the downsampled low pass filtered, frequency translated GPS C/A signals.

18. A mobile terminal according to claim 17 wherein the processor is configured to estimate the Doppler shifts from the frequency slices that are despread by frequency-translating the frequency slices that are despread by the Doppler shift frequency that is measured at the wireless network to obtain the residual Doppler shift due to mobile terminal motion, transforming the despread frequency translated slice sample points to the frequency domain, converting frequency domain complex values to magnitude values, and adding the magnitude values on a point-by-point basis across the frequency slices.

19. A mobile terminal according to claim 18 wherein the processor is configured to estimate the code phases of the GPS C/A signals by removing a total Doppler shift by frequency-translating the GPS C/A signals by a sum of the residual Doppler shifts that are estimated plus the Doppler shift that is measured at the wireless network, summing segments of the GPS C/A signals from which the total Doppler shift has been removed, correlating the summed segments with an internally generated code frame and determining a time offset corresponding to a peak magnitude squared value.

20. A mobile terminal according to claim 18, wherein the processor is configured to estimate the code phases of the GPS C/A signals by calculating phases of the frequency slice values that have been converted to the frequency domain, determining phase angles corresponding to the estimated Doppler shift frequency for each of the slices, and determining a residual code phase from the phase angles.

21. A mobile terminal according to claim 15 wherein the wireless network is a terrestrial wireless network.

22. A mobile terminal according to claim 21 wherein the terrestrial wireless network comprises a terrestrial cellular network, an ancillary terrestrial network and/or a wireless local and/or wide area network.

23. A mobile terminal according to claim 15 wherein the wireless network is a satellite wireless network and wherein the Doppler shift and C/A code phase that are measured at the satellite wireless network are referenced to a point on the earth determined by measuring relative differences in received signal levels between adjacent satellite beams at the mobile terminal.

24. A mobile terminal according to claim 15 wherein the wireless network is a satellite wireless network and wherein the Doppler shift and C/A code phase that are measured at the satellite wireless network are referenced to a point on the earth determined by measuring path delays between the mobile terminal and a satellite gateway via at least two satellites.

25. A mobile terminal according to claim 15 further comprising a transmitter that is configured to transmit the estimated Doppler shifts and/or the estimated received code phases of the GPS C/A signals.

26. A mobile terminal according to claim 15, wherein the mobile terminal includes a GPS processor and a cellular data transceiver therein.

27. A mobile terminal according to claim 15, wherein the mobile terminal includes a GPS processor and a cellular voice and data transceiver therein.

28. A mobile terminal according to claim 15, wherein the mobile terminal includes a GPS processor, a terrestrial cellular voice and data transceiver and a satellite cellular voice and data transceiver therein.

29. A wireless communications method comprising:
transmitting wireless communications including Global Positioning System (GPS) data over a satellite network using a satellite frequency band that is outside a GPS frequency band;
receiving the wireless communications including the GPS data from the satellite network at a mobile terminal over the satellite frequency band that is outside the GPS frequency band; and
performing pseudo-range measurements at the mobile terminal using the GPS data that is received over the satellite frequency band that is outside the GPS frequency band.

30. A wireless communications method according to claim 29 further comprising transmitting the pseudo-range measurements from the mobile terminal to a network operations center.

31. A cellular wireless communications method according to claim 30 further comprising receiving the pseudo-range measurements and determining a position of the mobile terminal using the pseudo-range measurements, at the network operations center.

32. A wireless communications method according to claim 31 further comprising receiving the position of the mobile terminal at the mobile terminal from the network operations center.

33. A wireless communications method according to claim 30 wherein transmitting the pseudo-range measurements comprises transmitting the pseudo-range measurements to the network operations center via the satellite network.

34. A wireless communications method according to claim 30 further comprising wirelessly communicating between a space-based component and the mobile terminal over the satellite frequency band and wherein transmitting the pseudo-range measurements comprises transmitting the pseudo-range measurements to the network operations center via the space-based component.

35. A wireless communications method according to claim 29 wherein the following is performed at the mobile terminal:
receiving GPS C/A signals from a plurality of GPS satellites;
estimating Doppler shifts in the GPS C/A signals; and
estimating received code phases of the GPS C/A signals using the Doppler shifts that are estimated.

36. A wireless communications method according to claim 35 wherein the GPS data that is received from the satellite network includes a Doppler shift and a code phase;
wherein estimating Doppler shifts comprises estimating residual Doppler shifts in the GPS C/A signals due to mobile terminal motion using the Doppler shift and code phase; and
wherein estimating code phases comprises estimating the code phases of the GPS C/A signals using the Doppler shift that is estimated.

37. A wireless communications method comprising:
transmitting wireless communications including Global Positioning System (GPS) data from at least one satellite to mobile terminals over a satellite frequency band that is outside a GPS frequency band.

38. A terrestrial wireless method according to claim 37 further comprising:
receiving pseudo-range measurements from mobile terminals at the at least one satellite over the satellite frequency band.

39. A terrestrial wireless method according to claim 38 further comprising:
transmitting the pseudo-range measurements to a network operations center from the at least one satellite.

40. A terrestrial wireless method according to claim 38 further comprising:
receiving the pseudo-range measurements and determining a position using the pseudo-range measurements, at the network operations center.

41. A terrestrial wireless method according to claim 40 further comprising receiving the position of the mobile terminal at the mobile terminal from the network operations center.

42. A mobile terminal operating method comprising:
receiving Global Positioning System (GPS) C/A signals from a plurality of GPS satellites;
estimating Doppler shifts in the GPS C/A signals; and
estimating received code phases of the GPS C/A signals using the Doppler shifts that are estimated.

43. A method accordingly to claim 42:
wherein receiving further comprises receiving from a wireless network a Doppler shift and a code phase;
wherein estimating Doppler shifts comprises estimating residual Doppler shifts in the C/A signals due to mobile terminal motion using the Doppler shift and code phase; and
wherein the estimating received code phases comprises estimating the code phases of the GPS C/A signals using the Doppler shift that is estimated.

44. A method according to claim 43 wherein estimating residual Doppler shifts in the GPS C/A signals due to mobile terminal motion comprises:
bandpass filtering the GPS C/A signals into frequency slices;
despreading the frequency slices; and
estimating the Doppler shifts from the frequency slices that are despread.

45. A method according to claim 44:
wherein bandpass filtering the GPS C/A signals into slices comprises:
frequency translating the GPS C/A signals;
low pass filtering the GPS C/A signals that are frequency translated; and
downsampling the low pass filtered, frequency translated GPS C/A signals; and
wherein despreading the frequency slices comprises:
generating an internal reference code sequence;
frequency translating the internal reference code sequence for each frequency slice;
low pass filtering the frequency translated reference code sequences; and
multiplying by the downsampled low pass filtered, frequency translated GPS C/A signals.

46. A method according to claim 45 wherein estimating the Doppler shifts from the frequency slices that are despread comprises:
frequency-translating the frequency slices that are despread by the Doppler shift frequency that is measured at the wireless network to obtain a residual Doppler shift due to mobile terminal motion;
transforming the frequency-translated and despread slice sample points to the frequency domain;
converting frequency domain complex values to magnitude values; and
adding the magnitude values on a point-by-point basis across the frequency slices.

47. A method according to claim 46 wherein estimating the code phases of the GPS C/A signals comprises:
removing a total Doppler shift by frequency-translating the GPS C/A signals by a sum of the residual Doppler shifts that are estimated plus the Doppler shift that is measured at the wireless network;
summing segments of the GPS C/A signals from which the total Doppler shift has been removed;
correlating the summed segments with an internally generated code frame; and
determining a time offset corresponding to a peak magnitude squared value.

48. A method according to claim 46 wherein estimating the code phases of the GPS C/A signals comprises:
calculating phases of the frequency domain slice values;
determining phase angles corresponding to the estimated Doppler shift frequency for each of the slices; and
determining a residual code phase from the phase angles.

49. A method according to claim 43 wherein the wireless network is a terrestrial wireless network.

50. A method according to claim 49 wherein the terrestrial wireless network comprises a terrestrial cellular network, an ancillary terrestrial network and/or a wireless local and/or wide area network.

51. A method according to claim 43 wherein the wireless network is a satellite wireless network and wherein the Doppler shift and C/A code phase that are measured at the satellite wireless network are referenced to a point on the earth determined by measuring relative differences in received signal levels between adjacent satellite beams at the mobile terminal.

52. A method according to claim 43 wherein the wireless network is a satellite wireless network and wherein the Doppler shift and C/A code phase that are measured at the satellite wireless network are referenced to a point on the earth determined by measuring path delays between the mobile terminal and a satellite gateway via at least two satellites.

53. A method according to claim 43 further comprising transmitting the estimated Doppler shifts and/or the estimated received code phases of the GPS C/A signals.

54. A method according to claim 43, wherein the mobile terminal includes a GPS processor and a cellular data transceiver therein.

55. A method according to claim 43, wherein the mobile terminal includes a GPS processor and a terrestrial cellular voice and data transceiver therein.

56. A method according to claim 43, wherein the mobile terminal includes a GPS processor, a terrestrial cellular voice and data transceiver and a satellite cellular voice and data transceiver therein.

* * * * *